(12) United States Patent
Qian

(10) Patent No.: US 12,262,156 B2
(45) Date of Patent: Mar. 25, 2025

(54) WHITE BALANCE PROCESSING METHOD AND ELECTRONIC DEVICE

(71) Applicant: Honor Device Co., Ltd., Shenzhen (CN)

(72) Inventor: Yanlin Qian, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/006,180

(22) PCT Filed: Sep. 7, 2022

(86) PCT No.: PCT/CN2022/117586
§ 371 (c)(1),
(2) Date: Jan. 20, 2023

(87) PCT Pub. No.: WO2023/040725
PCT Pub. Date: Mar. 23, 2023

(65) Prior Publication Data
US 2024/0129446 A1  Apr. 18, 2024

(30) Foreign Application Priority Data

Sep. 15, 2021 (CN) .......................... 202111081629.X
Dec. 20, 2021 (CN) .......................... 202111560454.0

(51) Int. Cl.
*H04N 9/73* (2023.01)
*G06T 3/4015* (2024.01)
(Continued)

(52) U.S. Cl.
CPC ............. *H04N 9/73* (2013.01); *G06T 3/4015* (2013.01); *G06V 10/751* (2022.01); *G06V 10/82* (2022.01); *H04N 23/62* (2023.01); *H04N 23/88* (2023.01)

(58) Field of Classification Search
CPC .......... H04N 9/73; H04N 23/62; H04N 23/88; H04N 5/00; H04N 23/63; H04N 23/951;
(Continued)

(56) References Cited

U.S. PATENT DOCUMENTS 7,227,571 B2   6/2007 Katoh
8,508,624 B1 * 8/2013 Linzer .................. H04N 9/646
                                                        348/241
(Continued)

FOREIGN PATENT DOCUMENTS

CN   102404582 A   4/2012
CN   107578390 A   1/2018
(Continued)

OTHER PUBLICATIONS

Park, C., et al., "Color Restoration of RGBN Multispectral Filter Array Sensor Images Based on Spectral Decomposition", Sensors, vol. 16, No. 5, May 18, 2016, 26 pages.
(Continued)

*Primary Examiner* — Michael S Osinski
(74) *Attorney, Agent, or Firm* — Conley Rose, P.C.

(57) ABSTRACT

A white balance processing method and an electronic device are provided. The method includes: obtaining a first image in response to a first operation, where the first image is an image of a first color space captured by a multispectral color filter array sensor; performing decomposition processing and demosaicing processing on the first image to obtain a second image and a third image; obtaining a color correction matrix according to the second image and the third image, where the color correction matrix represents a pixel change amount of transforming the second image into the third image; inputting the color correction matrix into a white balance model to obtain a white balance parameter; and
(Continued)

performing image processing on the first image according to the white balance parameter to obtain a fourth image.

20 Claims, 13 Drawing Sheets

(51) Int. Cl.
*G06V 10/75* (2022.01)
*G06V 10/82* (2022.01)
*H04N 23/62* (2023.01)
*H04N 23/88* (2023.01)

(58) Field of Classification Search
CPC .... H04N 25/11; H04N 25/135; H04N 25/136; H04N 1/6077; H04N 9/67; G06T 3/4015; G06T 2207/20084; G06T 2207/20081; G06T 2207/10024; G06T 3/4046; G06T 5/60; G06T 5/70; G06T 5/73; G06V 10/751; G06V 10/82
See application file for complete search history.

(56) References Cited

U.S. PATENT DOCUMENTS

| | | | |
|---|---|---|---|
| 8,605,167 B2 | 12/2013 | Cote et al. | |
| 11,606,544 B2* | 3/2023 | Yue | G06T 7/80 |
| 11,948,279 B2* | 4/2024 | Kurmanov | G06T 5/60 |
| 2008/0297620 A1* | 12/2008 | Goel | H04N 23/88 |
| | | | 348/223.1 |
| 2009/0147098 A1* | 6/2009 | Li | H04N 1/6086 |
| | | | 348/E11.001 |
| 2012/0263379 A1 | 10/2012 | Bhatti et al. | |
| 2015/0271509 A1* | 9/2015 | Minoo | H04N 19/187 |
| | | | 375/240.29 |
| 2020/0204773 A1* | 6/2020 | Geese | G06T 1/0007 |
| 2020/0304732 A1 | 9/2020 | Finlayson et al. | |
| 2021/0058596 A1 | 2/2021 | Afifi et al. | |
| 2022/0261955 A1* | 8/2022 | Takahama | H04N 23/60 |
| 2022/0270222 A1* | 8/2022 | Kashiwagi | G06T 5/60 |
| 2022/0309612 A1* | 9/2022 | Takahama | G06N 3/084 |
| 2023/0043536 A1* | 2/2023 | Herman | G06T 5/70 |
| 2023/0328396 A1* | 10/2023 | Zhang | H04N 1/58 |
| | | | 348/223.1 |

FOREIGN PATENT DOCUMENTS

| | | |
|---|---|---|
| CN | 108377373 A | 8/2018 |
| CN | 109523485 A | 3/2019 |
| CN | 111314684 A | 6/2020 |
| CN | 112565728 A | 3/2021 |
| CN | 113556526 A | 10/2021 |
| CN | 113596427 A | 11/2021 |
| EP | 1331828 A1 | 7/2003 |
| JP | 2013158025 A | 8/2013 |

OTHER PUBLICATIONS

Yasuma, F., et al., "Generalized Assorted Pixel Camera: Postcapture Control of Resolution, Dynamic Range, and Spectrum", IEEE Transactions on Image Processing, vol. 19, No. 9, Sep. 1, 2010, 13 pages.

* cited by examiner

TO FIG. 10B

WHITE BALANCE PROCESSING METHOD AND ELECTRONIC DEVICE

CROSS-REFERENCE TO RELATED APPLICATIONS

This application is a U.S. National Stage of International Application No. PCT/CN2022/117586 filed on Sep. 7, 2022, which claims priority to Chinese Patent Application No. 202111081629.X, filed with the China National Intellectual Property Administration on Sep. 15, 2021, and claims priority to Chinese Patent Application No. 202111560454.0, filed with the China National Intellectual Property Administration on Dec. 20, 2021, all of which are incorporated herein by reference in their entireties.

TECHNICAL FIELD

This application relates to the field of image processing, and specifically, to a white balance processing method and an electronic device.

BACKGROUND

When the electronic device captures an image, the color of an object in the image will be affected by the color of a light source. For an image sensor, it is impossible to accurately determine the color of the object under the light source in any colors. Therefore, the image color needs to be adjusted through a series of operations such as white balance processing, a color transformation matrix and a three-dimensional lookup table. White balance processing refers to an operation of reversely eliminating the influence of the color of the light source in the image by accurately estimating the color of the light source, so as to achieve the effect of shooting with white light.

Currently, existing image white balance processing relies on the single-frame image, for example, image information with 3 channels. For some photographing scenarios, for example, a scenario of photographing objects in pure colors in a short distance, the accuracy of the existing white balance processing still needs to be improved. Therefore, how to perform white balance processing on the image to improve the color accuracy of the image becomes a problem to be resolved urgently.

SUMMARY

This application provides a white balance processing method and an electronic device, which can improve the color accuracy in an image.

According to a first aspect, the white balance processing method is provided, applicable to the electronic device and including:

displaying a first interface, where the first interface includes a first control;

detecting a first operation on the first control;

obtaining a first image in response to the first operation, where the first image refers to an image of a first color space captured by a multispectral color filter array sensor;

performing decomposition processing and demosaicing processing on the first image to obtain a second image and a third image, where the second image is an image in a first color mode and the third image is an image in a second color mode;

obtaining a color correction matrix according to the second image and the third image, where the color correction matrix is used for representing a pixel change amount of transforming the second image into the third image;

inputting the color correction matrix into a white balance model to obtain a white balance parameter; and performing image processing on the first image according to the white balance parameter to obtain a fourth image, where the white balance model is used for calculating a parameter of white balance processing, the white balance model is obtained through training using a sample color correction matrix as input data and first pixel information as target data, the sample color correction matrix is obtained according to a third sample image and a fourth sample image, the sample color correction matrix is used for representing a pixel change amount of transforming the third sample image into the fourth sample image, the third sample image and the fourth sample image are obtained by performing the decomposition processing and the demosaicing processing on a first sample image, the first pixel information refers to a pixel value corresponding to a neutral color block included in a color checker in a fifth sample image, the fifth sample image is obtained by performing the decomposition processing and the demosaicing processing on a second sample image, the first sample image and the second sample image refer to images of the first color space captured by the multispectral color filter array sensor under a same light source scenario, and the second sample image includes the color checker.

Exemplarily, the first color space may be a Raw color space; the color checker may refer to a color board including different colors and the color board includes a neutral color; and the neutral color may refer to black, white, and various shades of gray that are blended with black and white.

It is to be understood that, a color filter array (color filter array, CFA) sensor refers to a sensor covering a mosaic color filter array on a pixel sensor, and is used for collecting color information of the image; a general photoelectric sensor can only feel the strength of light and cannot distinguish a wavelength (color) of the light; and a filter array sensor may obtain the color information of a pixel point through color filter (color filter).

Optionally, a Raw image that may be captured by the color filter array sensor may include an RGB color mode and another color mode. For example, the captured Raw image may refer to an RGBCYM image, or, an RGBCYGM image, or an image in the another color mode.

It is to be understood that, a neutral material of a neutral color block reflects light with various wavelengths uniformly. Therefore, any color of light that shines on the color checker reflects the light of that color. For example, red light that shines on the neutral color block of the color checker reflects the red light; or green light that shines on the neutral color block of the color checker reflects the green light. Therefore, a neutral color checker of the color checker may be used for marking a color of a light source.

In the embodiments of this application, the first image is captured through the multispectral color filter array sensor, and the second image and the third image in different color modes may be obtained through performing the decomposition processing and the demosaicing processing on the first image. The color correction matrix may be obtained according to the second image and the third image, and the white balance parameter may be obtained by inputting the color correction matrix into the white balance model. The fourth image is obtained by performing the image processing on the first image through the white balance parameter. Because the color information in the image (for example, a Raw image with 6 channels) captured by the multispectral color filter array sensor is more than the color information of a single-frame image (for example, an image with 3 channels), the white balance parameter obtained through the first image can improve the accuracy of the white balance processing and the color accuracy of the image.

With reference to the first aspect, in some implementations of the first aspect, the performing decomposition processing and demosaicing processing on the first image to obtain a second image and a third image includes:
  performing the decomposition processing on the first image to obtain a first Bayer pattern image and a second Bayer pattern image, where the first Bayer pattern image is a Bayer pattern image in the first color mode and the second Bayer pattern image is a Bayer pattern image in the second color mode;
  performing the demosaicing processing on the first Bayer pattern image to obtain the second image; and
  performing the demosaicing processing on the second Bayer pattern image to obtain the third image.

Optionally, in a possible implementation, the first color mode may refer to the RGB color mode, and the first Bayer pattern image may refer to an RGGB image; and the second color mode may refer to a CYM color mode, and the second Bayer pattern image may refer to a CYYM image.

Optionally, in a possible implementation, the first color mode may refer to the RGB color mode, and the first Bayer pattern image may refer to an RGGB image; and the second color mode may refer to a CYGM color mode, and the second Bayer pattern image may refer to a CYGM image.

It should be noted that, the first image captured by the multispectral color filter array sensor may include the RGB color mode and the another color mode, and the another color mode may refer to the CYM color mode, the CYGM color mode or an other color mode.

With reference to the first aspect, in some implementations of the first aspect, the second image includes a first pixel, a second pixel and a third pixel, the third image includes a fourth pixel, a fifth pixel and a sixth pixel, and the obtaining a color correction matrix according to the second image and the third image includes:
  obtaining a first vector according to a difference between the first pixel and the fourth pixel;
  obtaining a second vector according to a difference between the second pixel and the fifth pixel;
  obtaining a third vector according to a difference between the third pixel and the sixth pixel; and
  composing the color correction matrix by the first vector, the second vector, and the third vector.

Optionally, in a possible implementation, the first Bayer pattern image is the RGGB image, and the second Bayer pattern image is the CMMY image; each pixel in an RGB image may correspond to one group of RGB value, and each pixel in a CMY image may correspond to one group of CMY value; a 3×1 matrix may be obtained by transforming the RGB value corresponding to an R pixel into the CMY value corresponding to a C pixel; similarly, a 3×1 matrix may be obtained by transforming the RGB value corresponding to a G pixel into the CMY value corresponding to a M pixel; a 3×1 matrix may be obtained by transforming the RGB value corresponding to a B pixel into the CMY value corresponding to a Y pixel; and a 3×3 color correction matrix is obtained through the 3 one dimensional matrixes.

With reference to the first aspect, in some implementations of the first aspect, a parameter of the white balance model is obtained through iteration using a back propagation algorithm according to a difference between predicted pixel information and the first pixel information, and the predicted pixel information refers to output information obtained by inputting the sample color correction matrix into the white balance model.

With reference to the first aspect, in some implementations of the first aspect, the multispectral color filter array sensor refers to a sensor covering a mosaic color filter array on a pixel sensor.

With reference to the first aspect, in some implementations of the first aspect, the white balance model is a fully connected neural network.

With reference to the first aspect, in some implementations of the first aspect, the first interface refers to a main screen interface of the electronic device, the main screen interface includes a camera application program, and the first control refers to a control corresponding to the camera application program.

Optionally, in a possible implementation, the first operation refers to an operation of clicking the camera application program.

With reference to the first aspect, in some implementations of the first aspect, the first interface refers to a photographing interface, and the first control refers to a control used for instructing to photograph.

Optionally, in a possible implementation, the first operation refers to an operation of clicking the control used for instructing to photograph.

With reference to the first aspect, in some implementations of the first aspect, the first interface refers to a video shooting interface, and the first control refers to a control used for instructing to shoot a video.

Optionally, in a possible implementation, the first operation refers to an operation of clicking the control used for instructing to shoot a video.

The foregoing is described by taking an example in which the first operation is a clicking operation; the first operation may further include an audio instruct operation, or another operation instructing the electronic device to photograph or shooting a video; and the foregoing is merely an example of description, and does not constitute any limitation on this application.

According to a second aspect, two white balance model training methods are provided, including:
  obtaining training data, where the training data includes a first sample image and a second sample image, the first sample image and the second sample image refer to images of a first color space captured by a multispectral color filter array sensor under a same light source scenario, and the second sample image includes a color checker;
  performing decomposition processing and demosaicing processing on the first sample image to obtain a third sample image and a fourth sample image, where the third sample image is an image in a first color mode and the fourth sample image is an image in a second color mode;
  obtaining a sample color correction matrix according to the third sample image and the fourth sample image, where the sample color correction matrix is used for representing a pixel change amount of transforming the third sample image into the fourth sample image;

performing the decomposition processing and the demosaicing processing on the second sample image to obtain a fifth sample image, where the fifth sample image is an image in the first color mode; and training a white balance model by using the sample color correction matrix as input data and using first pixel information in the fifth sample image as target data to obtain a trained white balance model, where the white balance model is used for calculating a parameter of white balance processing, and the first pixel information refers to a pixel value corresponding to a neutral color block included in the color checker in the fifth sample image.

Exemplarily, the first color space may be a Raw color space; the color checker may refer to a color board including different colors and the color board includes a neutral color; and the neutral color may refer to black, white, and various shades of gray that are blended with black and white.

It is to be understood that, a color filter array sensor refers to a sensor covering a mosaic color filter array on a pixel sensor, and is used for collecting color information of the image; a general photoelectric sensor can only feel the strength of light and cannot distinguish a wavelength (color) of the light; and a filter array sensor may obtain the color information of a pixel point through color filter (color filter).

Optionally, a Raw image that may be captured by the color filter array sensor may include an RGB color mode and another color mode. For example, the captured Raw image may refer to an RGBCYM image, or, an RGBCYGM image, or an image in another color mode.

Optionally, the Raw image obtained by the multispectral color filter array sensor may be an RGBCMY image, where R represents red (red). G represents green (green), B represents blue (blue). C represents cyan (cyan), M represents mayenta (mayenta), and Y represents yellow (yellow).

Optionally, the Raw image obtained by the multispectral color filter array sensor may be the RGBCYGM image, where R represents red (red), G represents green (green), B represents blue (blue), C represents cyan (cyan), Y represents yellow (yellow), and M represents mayenta (mayenta).

It is to be understood that, a neutral material of a neutral color block reflects light with various wavelengths uniformly. Therefore, any color of light that shines on the color checker reflects the light of that color. For example, red light that shines on the neutral color block of the color checker reflects the red light; or green light that shines on the neutral color block of the color checker reflects the green light. Therefore, the neutral color block of the color checker may be used for marking a color of a light source.

Optionally, in a possible implementation, during obtaining target data for training the white balance model, demosaic algorithm processing may be performed on the second sample image to obtain a processed image; and a pixel value of RGB in the pixel value corresponding to the neutral color block of the color checker is obtained in the processed image.

In the embodiments of this application, the first sample image without the color checker and the second sample image with the color checker are captured through the multispectral color filter array sensor under a same light source and a same scenario. The input data for training the white balance model may be obtained through processing the first sample image. The target data for training the white balance model may be obtained through the second sample image. The trained white balance model obtained through the training method of the white balance model according to the embodiments of this application may be used for calculating the parameter of white balance processing, and white balance processing may be performed according to the parameter on the Raw image captured by the multispectral color filter array sensor. In the embodiments of this application, because the training data of training the white balance model is the image captured by the multispectral color filter array sensor, and the color information in the image (for example, a Raw image with 6 channels) captured by the multispectral color filter array sensor is more than the color information of a single-frame image (for example, an image with 3 channels), the parameter used for white balance processing outputted by the trained white balance model can improve the accuracy of the white balance processing and the color accuracy of the image.

With reference to the second aspect, in some implementations of the second aspect, the training the white balance model by using the sample color correction matrix as input data and using first pixel information in the fifth sample image as target data includes:

inputting the sample color correction matrix into the white balance model to obtain predicted pixel information; and training the white balance model according to the predicted pixel information and the first pixel information to obtain the trained white balance model.

It is to be understood that, the predicted pixel information refers to a predicted light source RGB value.

With reference to the second aspect, in some implementations of the second aspect, the parameter of the trained white balance model is obtained through iteration using a back propagation algorithm according to a difference between the predicted pixel information and the first pixel information.

Optionally, the white balance model may be trained through back iteration according to an angular error loss (Angular Error Loss) between the predicted pixel information and the first pixel information.

With reference to the second aspect, in some implementations of the second aspect, the multispectral color filter array sensor refers to a sensor covering a mosaic color filter array on a pixel sensor.

With reference to the second aspect, in some implementations of the second aspect, the white balance model is a fully connected neural network.

According to a third aspect, an electronic device is provided, including a module/unit configured to perform the first aspect or any method of the first aspect.

According to a fourth aspect, an electronic device is provided, including a module/unit configured to perform the second aspect or any method of the second aspect.

According to a fifth aspect, an electronic device, including one or more processors and a memory, where the memory is coupled to the one or more processors, the memory is configured to store computer program code, the computer program code includes computer instructions, and the one or more processors invoke the computer instructions to cause the electronic device to perform the following steps:

displaying a first interface, where the first interface includes a first control;

detecting a first operation on the first control;

obtaining a first image in response to the first operation, where the first image refers to an image of a first color space captured by a multispectral color filter array sensor;

performing decomposition processing and demosaicing processing on the first image to obtain a second image and a third image, where the second image is an image in a first color mode and the third image is an image in a second color mode;

obtaining a color correction matrix according to the second image and the third image, where the color correction matrix is used for representing a pixel change amount of transforming the second image into the third image;

inputting the color correction matrix into a white balance model to obtain a white balance parameter; and performing image processing on the first image according to the white balance parameter to obtain a fourth image, where the white balance model is used for calculating a parameter of white balance processing, the white balance model is obtained through training using a sample color correction matrix as input data and first pixel information as target data, the sample color correction matrix is obtained according to a third sample image and a fourth sample image, the sample color correction matrix is used for representing a pixel change amount of transforming the third sample image into the fourth sample image, the third sample image and the fourth sample image are obtained by performing the decomposition processing and the demosaicing processing on a first sample image, the first pixel information refers to a pixel value corresponding to a neutral color block included in a color checker in a fifth sample image, the fifth sample image is obtained by performing the decomposition processing and the demosaicing processing on a second sample image, the first sample image and the second sample image refer to images of the first color space captured by the multispectral color filter array sensor under a same light source scenario, and the second sample image includes the color checker.

With reference to the fifth aspect, in some implementations of the fifth aspect, the one or more processors invoke the computer instructions to cause the electronic device to perform the following steps:

performing the decomposition processing on the first image to obtain a first Bayer pattern image and a second Bayer pattern image, where the first Bayer pattern image is a Bayer pattern image in the first color mode and the second Bayer pattern image is a Bayer pattern image in the second color mode;

performing the demosaicing processing on the first Bayer pattern image to obtain the second image; and performing the demosaicing processing on the second Bayer pattern image to obtain the third image.

With reference to the fifth aspect, in some implementations of the fifth aspect, the second image includes a first pixel, a second pixel and a third pixel, the third image includes a fourth pixel, a fifth pixel and a sixth pixel, and the one or more processors invoke the computer instructions to cause the electronic device to perform the following steps:

obtaining a first vector according to a difference between the first pixel and the fourth pixel, obtaining a second vector according to a difference between the second pixel and the fifth pixel;

obtaining a third vector according to a difference between the third pixel and the sixth pixel; and composing the color correction matrix by the first vector, the second vector, and the third vector.

With reference to the fifth aspect, in some implementations of the fifth aspect, a parameter of the white balance model is obtained through iteration using a back propagation algorithm according to a difference between predicted pixel information and the first pixel information, and the predicted pixel information refers to output information obtained by inputting the sample color correction matrix into the white balance model.

With reference to the fifth aspect, in some implementations of the fifth aspect, the multispectral color filter array sensor refers to a sensor covering a mosaic color filter array on a pixel sensor.

With reference to the fifth aspect, in some implementations of the fifth aspect, the white balance model is a fully connected neural network.

With reference to the fifth aspect, in some implementations of the fifth aspect, the first interface refers to a main screen interface of the electronic device, the main screen interface includes a camera application program, and the first control refers to a control corresponding to the camera application program.

With reference to the fifth aspect, in some implementations of the fifth aspect, the first interface refers to a photographing interface, and the first control refers to a control used for instructing to photograph.

With reference to the fifth aspect, in some implementations of the fifth aspect, the first interface refers to a video shooting interface, and the first control refers to a control used for instructing to shoot a video.

According to a sixth aspect, an electronic device is provided, including one or more processors and a memory, where the memory is coupled to the one or more processors, the memory is configured to store computer program code, the computer program code includes computer instructions, and the one or more processors invoke the computer instructions to cause the electronic device to perform the following steps:

obtaining training data, where the training data includes a first sample image and a second sample image, the first sample image and the second sample image refer to images of a first color space captured by a multispectral color filter array sensor under a same light source scenario, and the second sample image includes a color checker;

performing decomposition processing and demosaicing processing on the first sample image to obtain a third sample image and a fourth sample image, where the third sample image is an image in a first color mode and the fourth sample image is an image in a second color mode;

obtaining a sample color correction matrix according to the third sample image and the fourth sample image, where the sample color correction matrix is used for representing a pixel change amount of transforming the third sample image into the fourth sample image;

performing decomposition processing and demosaicing processing on the second sample image to obtain a fifth sample image, where the fifth sample image is an image in the first color mode; and training a white balance model by using the sample color correction matrix as input data and using first pixel information in the fifth sample image as target data to obtain a trained white balance model, where the white balance model is used for calculating a parameter of white balance processing, and the first pixel information refers to a pixel value corresponding to a neutral color block included in the color checker in the fifth sample image.

With reference to the sixth aspect, in some implementations of the sixth aspect, the one or more processors invoke the computer instructions to cause the electronic device to perform the following steps:

inputting the sample color correction matrix into the white balance model to obtain predicted pixel information; and training the white balance model according to the predicted pixel information and the first pixel information to obtain the trained white balance model.

With reference to the sixth aspect, in some implementations of the sixth aspect, the parameter of the trained white balance model is obtained through iteration using a back propagation algorithm according to a difference between the predicted pixel information and the first pixel information.

With reference to the sixth aspect, in some implementations of the sixth aspect, the multispectral color filter array sensor refers to a sensor covering a mosaic color filter array on a pixel sensor.

With reference to the sixth aspect, in some implementations of the sixth aspect, the white balance model is a fully connected neural network.

According to a seventh aspect, an electronic device is provided, used for white balance processing and including one or more processors and a memory, where the memory is coupled to the one or more processors, the memory is configured to store computer program code, the computer program code includes computer instructions, and the one or more processors invoke the computer instructions to cause the electronic device to perform the first aspect or any method in the first aspect.

According to an eighth aspect, an electronic device is provided, used for training a white balance model and including one or more processors and a memory, % here the memory is coupled to the one or more processors, the memory is configured to store computer program code, the computer program code includes computer instructions, and the one or more processors invoke the computer instructions to cause the electronic device to perform the second aspect or any training method in the second aspect.

According to a ninth aspect, a chip system is provided, applicable to an electronic device and including one or more processors, where the one or more processors are configured to invoke computer instructions to cause the electronic device to perform any method in the first aspect or the second aspect.

According to a tenth aspect, a computer-readable storage medium is provided, including computer instructions, where the computer instructions, when run on an electronic device, cause the electronic device to perform any method in the first aspect or the second aspect.

According to an eleventh aspect, a computer program product is provided. The computer program product includes computer program code, and when the computer program code is run by an electronic device, the electronic device is caused to perform any method in the first aspect or the second aspect.

In the embodiments of this application, the first sample image without the color checker and the second sample image with the color checker are captured through the multispectral color filter array sensor under the same light source and the same scenario. The input data for training the white balance model may be obtained through processing the first sample image. The target data for training the white balance model may be obtained through the second sample image. The trained white balance model obtained through the training method of the white balance model according to the embodiments of this application may be used for calculating the parameter of white balance processing, and white balance processing may be performed according to the parameter on the Raw image captured by the multispectral color filter array sensor. In the embodiments of this application, because the training data of training the white balance model is the image captured by the multispectral color filter array sensor, and the color information in the image (for example, a Raw image with 6 channels) captured by the multispectral color filter array sensor is more than the color information of a single-frame image (for example, an image with 3 channels), the parameter used for white balance processing outputted by the trained white balance model can improve the accuracy of the white balance processing and the color accuracy of the image.

DESCRIPTION OF EMBODIMENTS

Figure 1:
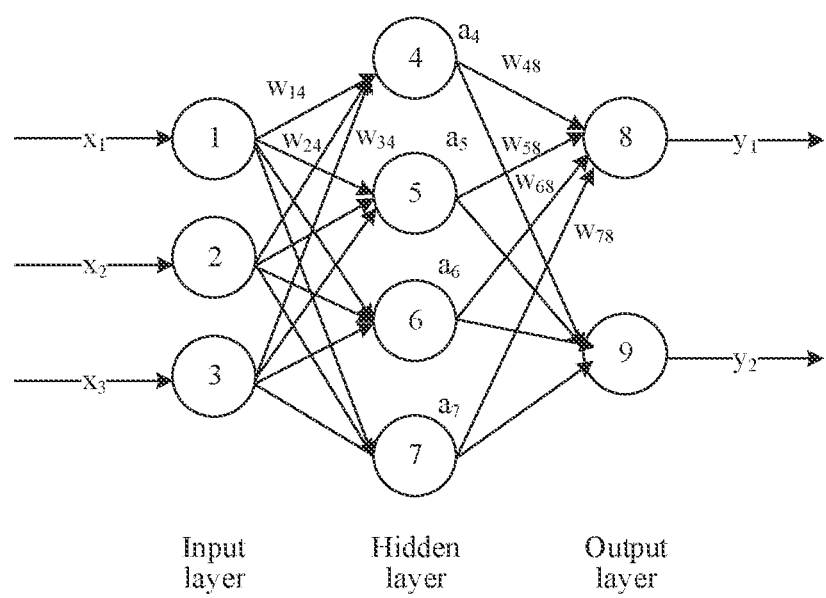
FIG. 1 is a schematic diagram of a fully connected neural network according to this application.

In the embodiments of this application, terms "first", "second", "third" and "fourth" are used merely for the purpose of description, and shall not be construed as indicating or implying relative importance or implying a quantity of indicated technical features.

For ease of understanding of the embodiments of this application, related concepts involved in the embodiments of this application are first briefly described below.

1. White Balance

White balance is an indicator describing the accuracy of a white color generated by mixing three primary colors, red, green, and blue, in a display. A white balance setting in a camera device is an important guarantee to ensure an ideal picture color; and white balance processing refers to an operation of reversely eliminating an influence of a light source color in an image by accurately estimating the light source color, so as to achieve an effect of shooting with white light.

2. Bayer Pattern

A Bayer pattern is one of main technologies of implementing photographing a colorful image by a charge-coupled device (charge-coupled device, CCD) or a complementary metal oxide semiconductor (complementary metal oxide semiconductor, CMOS) sensor; and the Bayer pattern may be a 4×4 pattern, for example, composed of 8 green, 4 blue, and 4 red pixels, and performing 9 operations in a 2×2 matrix during transforming a grayscale graphic into a colorful picture, to finally generate a colorful image.

3. Color Filter Array (Color Filter Array, CFA) Sensor

A color filter array sensor refers to a sensor covering a mosaic color filter array on a pixel sensor, and is configured to collect color information of an image; a general photoelectric sensor can only feel the strength of light and cannot distinguish a wavelength (color) of the light; and a filter array sensor may obtain the color information of a pixel point through color filter (color filter).

4. Color Mode

A color mode is a model of representing a certain color as a number or a manner of recording the color of an image.

5. Demosaic (Demosaic)

Demosaicing refers to an image processing process of transforming a Raw image into an RGB image.

6. Neutral Color

A neutral color may refer to black, white, and various shades of gray that are blended with black and white.

7. Neural Network

A neural network is a network formed by connecting many single neurons together. That is, an output of a neuron may be an input of another neuron. An input of each neuron may be connected with a local receptive field of a previous layer to extract a feature of the local receptive field. The local receptive field may be a region including several neurons.

8. Fully Connected Neural Network

A fully connected neural network, also known as a deep neural network (deep neural network, DNN) or a multi-layer neural network, may be understood as a neural network with a plurality of hidden layers. According to locations of different layers, neural networks inside the fully connected neural network may be classified into three types: input layers, hidden layers, and output layers. Generally, the first layer is an input layer, the last layer is an output layer, and middle layers are all hidden layers. The layers are fully connected. That is, any neuron in an $i^{th}$ layer needs to be connected to any neuron in an $(i+1)^{th}$ layer.

A working principle of the fully connected neural network may be expressed by the following linear relationship expression: $y=a(w \cdot x+b)$; where x represents an input vector, y represents an output vector, b represents an offset vector, W represents a weight matrix (also referred to as a coefficient), and a( ) represents an activation function. Each layer performs an operation through the linear expression on the input vector x to obtain the output vector y.

Because the DNN have many layers, the quantity of the coefficient w and the offset vector b are relatively large. These parameters in the DNN are defined as below:

As shown in FIG. 1, assuming that in a three-layer DNN, the three-layer DNN includes the input layer (the first layer), the hidden layer (the second layer), and the output layer (the third layer); and for example, the linear coefficient of a $4^{th}$ neuron in the second layer to a $1^{st}$ neuron in the third layer may be defined as $W_{78}$, and the subscript 78 correspondingly indicates an inputted second layer index 7 and an outputted third layer index 8.

9. Back Propagation Algorithm

A neural network may modify the size of a parameter in an initial neural network model during the training by using an error back propagation (back propagation, BP) algorithm, so that a rebuilding error loss of the neural network model becomes smaller. Specifically, an input signal is propagated forward until an output generates an error loss, and the parameter in the initial neural network model is updated through back propagation of error loss information, so that the error loss is converged. The back propagation algorithm is a back propagation motion dominated by an error loss, and is intended to obtain a parameter of an optimal neural network model, for example, a weight matrix.

The following describes a white balance processing method and an electronic device in the embodiments of this application with reference to accompanying drawings.

Figure 2:
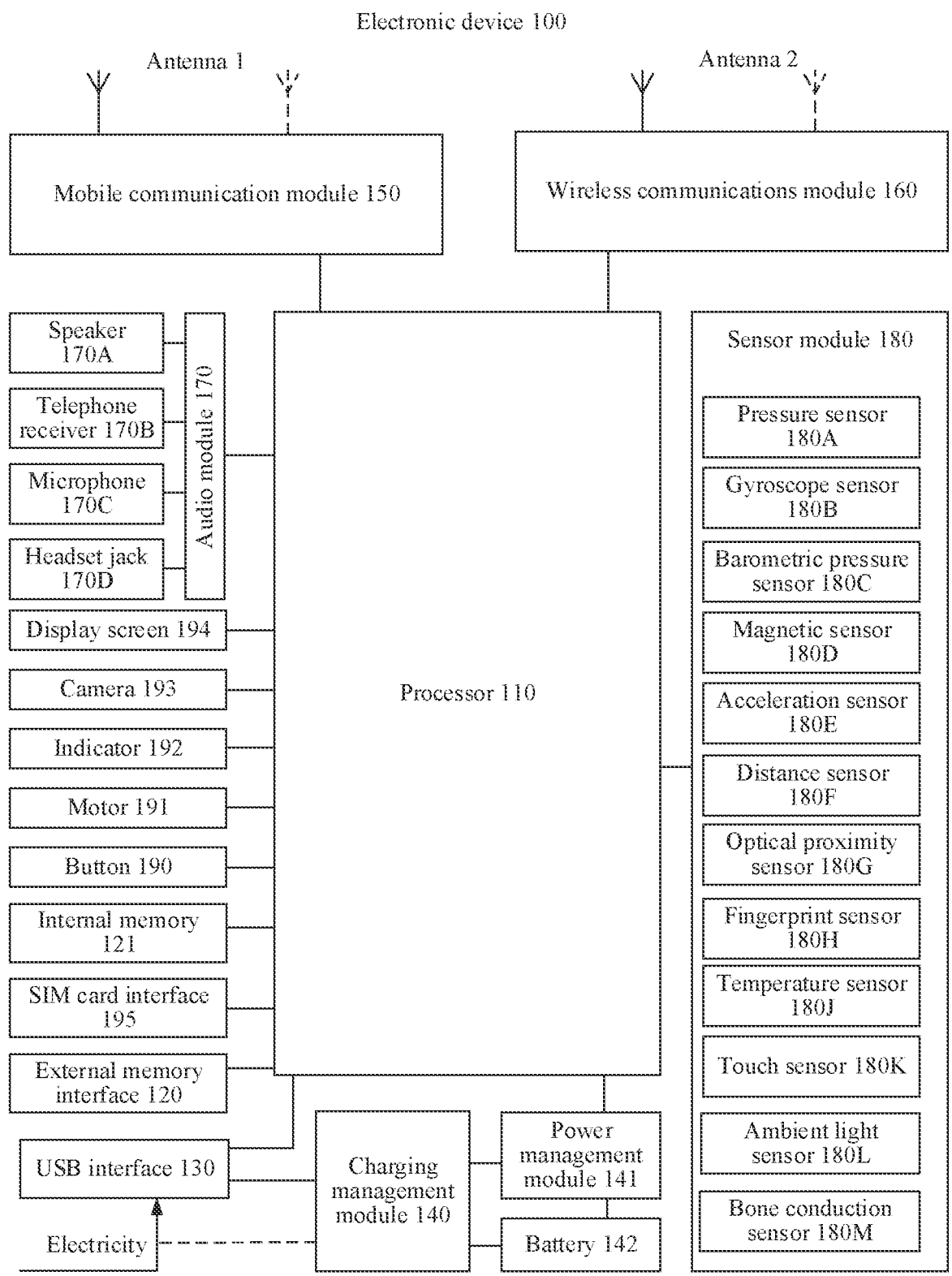
FIG. 2 is a schematic diagram of a hardware system applicable to an electronic device according to this application.

FIG. 2 shows a hardware system applicable to the electronic device according to this application.

An electronic device 100 may be a mobile phone, a smart screen, a tablet computer, a wearable electronic device, an in-vehicle electronic device, an augmented reality (augmented reality, AR) device, a virtual reality (virtual reality, VR) device, a notebook computer, an ultra-mobile personal computer (ultra-mobile personal computer, UMPC), a netbook, a personal digital assistant (personal digital assistant, PDA), a projector, or the like. A specific type of the electronic device 100 is not limited in this embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a telephone receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that, the structure shown in FIG. 2 does not constitute a specific limitation on the electronic device 100. In some other embodiments of this application, the electronic device 100 may include more or fewer components than the components shown in FIG. 2, or, the electronic device 100 may include a combination of some components in the components shown in FIG. 2, or, the electronic device 100 may include subcomponents of some components in the components shown in FIG. 2. The components shown in FIG. 2 may be implemented by hardware, software, or a combination of software and hardware.

The processor 110 may include one or more processing units. For example, the processor 110 may include at least one of the following processor units: an application processor (application processor, AP), a modem processor, a graphics processing unit (graphics processing unit, GPU), an image signal processor (image signal processor, ISP), a controller, a video codec, a digital signal processor (digital signal processor. DSP), a baseband processor, and a neural-network processing unit (neural-network processing unit, NPU). Different processing units may be independent components, or may be integrated components. The controller may generate an operating control signal according to an instruction operation code and a sequence signal, to complete control of fetching and executing instructions.

A memory may be further disposed in the processor 110, and is configured to store instructions and data. In some embodiments, the memory in the processor 110 is a cache memory. The memory may store instructions or data that has just been used or recycled by the processor 110. If the processor 110 needs to reuse the instructions or the data, the processor 110 may directly invoke the instructions or the data from the memory, which avoids repeated access, and reduces a waiting time of the processor 110, thereby improving system efficiency.

Exemplarily, the processor 110 may be configured to perform the white balance processing method according to the embodiments of this application. For example: displaying a first interface, where the first interface includes a first control; detecting a first operation on the first control; obtaining a first image in response to the first operation, where the first image refers to an image of a first color space captured by a multispectral color filter array sensor; performing decomposition processing and demosaicing processing on the first image to obtain a second image and a third image, where the second image is an image in a first color mode and the third image is an image in a second color mode; obtaining a color correction matrix according to the second image and the third image, where the color correction matrix is used for representing a pixel change amount of transforming the second image into the third image; inputting the color correction matrix into a white balance model to obtain a white balance parameter; and performing image processing on the first image according to the white balance parameter to obtain a fourth image.

Exemplarily, the processor 110 may be configured to perform the training methods of the white balance model according to the embodiments of this application. For example: obtaining training data, where the training data includes a first sample image and a second sample image, the first sample image and the second sample image refer to images of a first color space captured by a multispectral color filter array sensor under a same light source scenario, and the second sample image includes a color checker; performing decomposition processing and demosaicing processing on the first sample image to obtain a third sample image and a fourth sample image, where the third sample image is an image in a first color mode and the fourth sample image is an image in a second color mode; obtaining a sample color correction matrix according to the third sample image and the fourth sample image, where the sample color correction matrix is used for representing a pixel change amount of transforming the third sample image into the fourth sample image; performing the decomposition processing and the demosaicing processing on the second sample image to obtain a fifth sample image, where the fifth sample image is an image in the first color mode; and training a white balance model by using the sample color correction matrix as input data and using first pixel information in the fifth sample image as target data to obtain a trained white balance model, where the white balance model is used for calculating a parameter of white balance processing, and the first pixel information refers to a pixel value corresponding to a neutral color block included in the color checker in the fifth sample image.

A connection relationship among the modules shown in FIG. 2 is merely an example for description, and constitutes no limitation on the connection relationship among the modules of the electronic device 100. Optionally, the modules of the electronic device 100 may alternatively use a combination of a plurality of connection manners in the foregoing embodiment.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be multiplexed to improve antenna utilization. For example, the antenna 1 may be multiplexed as a diversity antenna of a wireless local area network. In some other embodiments, the antennas may be used with a tuning switch.

The electronic device 100 implements a display function by using the GPU, the display screen 194, and the application processor. The GPU is a microprocessor for image processing, and is connected to the display screen 194 and the application processor. The GPU is configured to perform mathematical and geometric calculation, and is configured to render a graphic. The processor 110 may include one or more GPUs, and execute program instructions to generate or change display information.

The display screen 194 may be configured to display an image or a video.

The electronic device 100 may implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and the electrical signal is converted into an image visible to a naked eye. The ISP may optimize an algorithm for noise, brightness, and colors of the image, and may further optimize parameters, such as exposure and color temperature, of a photographing scene. In some embodiments, the ISP may be disposed in the camera 193.

The camera 193 is configured to capture a static image or a video. An optical image of an object is generated through a lens and is projected onto a photosensitive element. The photosensitive element may be a charge coupled device (charge coupled device. CCD) or a complementary metal-oxide-semiconductor (complementary metal-oxide-semiconductor, CMOS) phototransistor. The photosensitive element converts an optical signal into an electrical signal, and then transfers the electrical signal to the ISP, to convert the electrical signal into a digital image signal. The ISP outputs the digital image signal to the DSP for processing. The DSP converts the digital image signal into a standard image signal in a standard format such as RGB (red green blue, RGB) or YUV. In some embodiments, the electronic device 100 may include 1 or N cameras 193, and N is a positive integer greater than 1.

The digital signal processor is configured to process a digital signal, and may further process another digital signal in addition to a digital image signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The gyroscope sensor 180B may be configured to determine a motion posture of the electronic device 100. In some embodiments, angular velocities of the electronic device 100 around three axes (i.e., x, y, and z axes) may be determined through the gyroscope sensor 180B. The gyroscope sensor 180B may be configured to prevent jitter during photographing. Exemplarily, when the shutter is pressed, the gyroscope sensor 180B detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyroscope sensor 180B may also be configured for scenarios such as a navigation scenario and a motion sensing game scenario.

Exemplarily, the gyroscope sensor 180B in this embodiment of this application may be configured to collect jitter information, and the jitter information may be used for representing a pose change of the electronic device during photographing.

The acceleration sensor 180E may detect an acceleration value of the electronic device 100 in all directions (generally x, y, and z axes). When the electronic device 100 is stationary, a magnitude and a direction of gravity may be detected. The acceleration sensor 180E may be further configured to recognize a posture of the electronic device 100 as an input parameter of an application program such as switching between landscape orientation and portrait orientation or a pedometer.

The distance sensor 180F is configured to measure a distance. The electronic device 100 may measure a distance through infrared light or laser. In some embodiments, for example, in a photographing scenario, the electronic device 100 may measure a distance by using the distance sensor 180F, to implement quick focusing.

The ambient light sensor 180L is configured to perceive ambient light brightness. The electronic device 100 may adaptively adjust brightness of the display screen 194 according to the perceived ambient light brightness. The ambient light sensor 180L may be further configured to automatically adjust white balance during photographing. The ambient light sensor 180L may further cooperate with the optical proximity sensor 180G to detect whether the electronic device 100 is in a pocket, so as to prevent an accidental touch.

The fingerprint sensor 180H is configured to collect a fingerprint. The electronic device 100 may implement a function such as unlock, application lock accessing, photographing, call answering, or the like by using a feature of the collected fingerprint.

The touch sensor 180K is also referred to as a touch control device. The touch sensor 180K may be disposed in the display screen 194, and the touch sensor 180K and the display screen 194 constitute a touchscreen, and the touch-screen is also referred to as a touch control screen. The touch sensor 180K is configured to detect a touch operation on or near the touch sensor 180K. The touch sensor 180K may transfer the detected touch operation to the application processor to determine a touch event type. The touch sensor 180K may provide a visual output related to the touch operation by using the display screen 194. In some other embodiments, the touch sensor 180K may alternatively be disposed on a surface of the electronic device 100, and is located on a position different from that of the display screen 194.

When the electronic device captures an image, the color of an object in the image will be affected by the color of a light source. For an image sensor, it is impossible to accurately determine the color of the object under the light source in any colors. Therefore, the image color needs to be adjusted through a series of operations such as white balance processing, a color transformation matrix and a three-dimensional lookup table. White balance processing refers to an operation of reversely eliminating an influence of a light source color in an image by accurately estimating the light source color, so as to achieve an effect of shooting with white light. Currently, existing image white balance processing relies on the single-frame image, for example, image information with 3 channels. For some photographing scenarios, for example, a scenario of photographing objects in pure colors in a short distance, the accuracy of the existing white balance processing still needs to be improved.

In view of this, the embodiments of this application provide a white balance processing method and an electronic device. In the embodiments of this application, the first image is captured through the multispectral color filter array sensor, and the second image and the third image in different color modes may be obtained through performing the decomposition processing and the demosaicing processing on the first image. The color correction matrix may be obtained according to the second image and the third image, and the white balance parameter may be obtained by inputting the color correction matrix into the white balance model. The fourth image is obtained by performing the image processing on the first image through the white balance parameter. Because the color information in the image (for example, a Raw image with 6 channels) captured by the multispectral color filter array sensor is more than the color information of a single-frame image (for example, an image with 3 channels), the white balance parameter obtained through the first image can improve the accuracy of the white balance processing and the color accuracy of the image.

Figure 3:
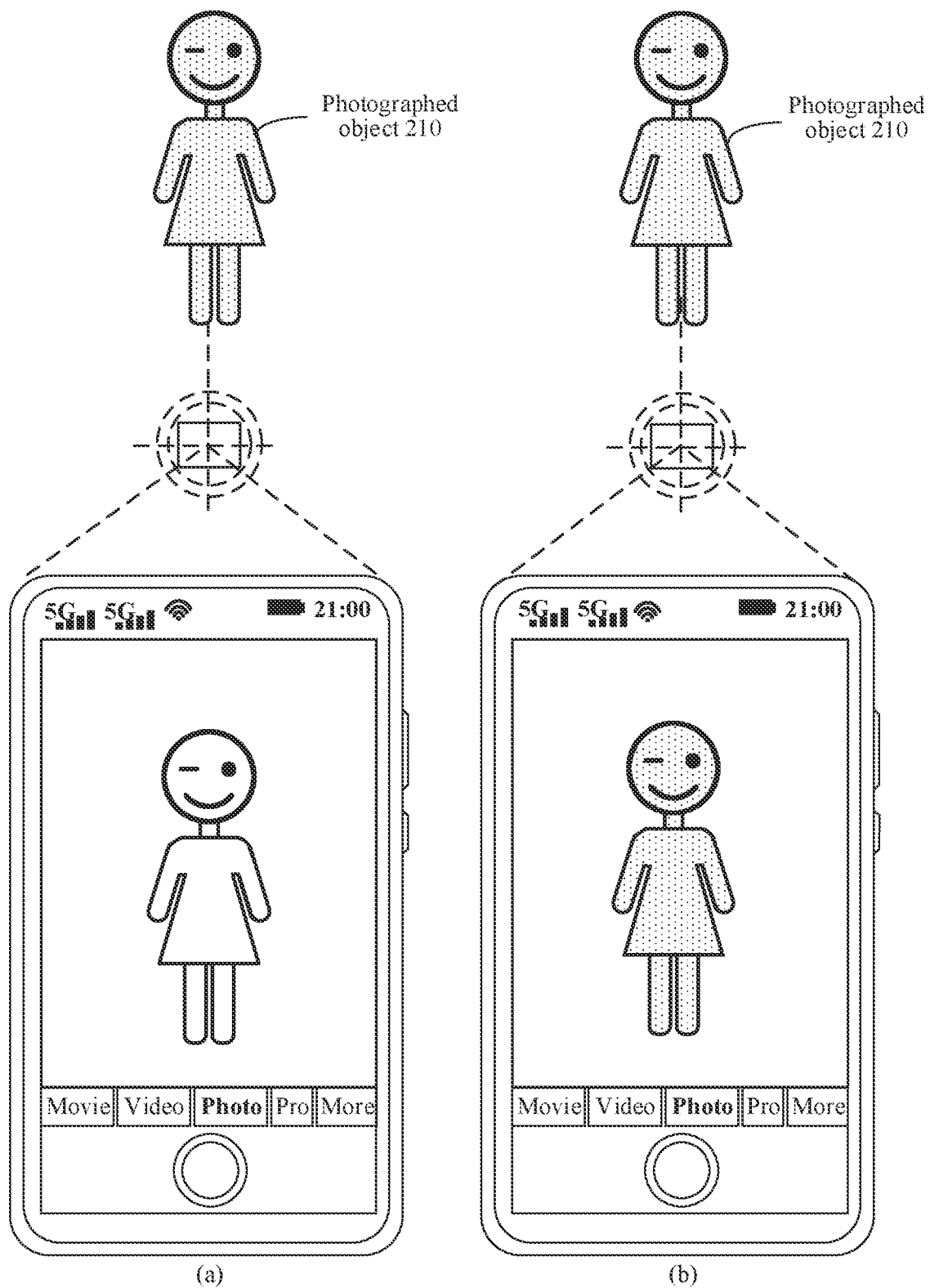
FIG. 3 is a schematic diagram of an application scenario applicable to an embodiment of this application.
Figure 4:
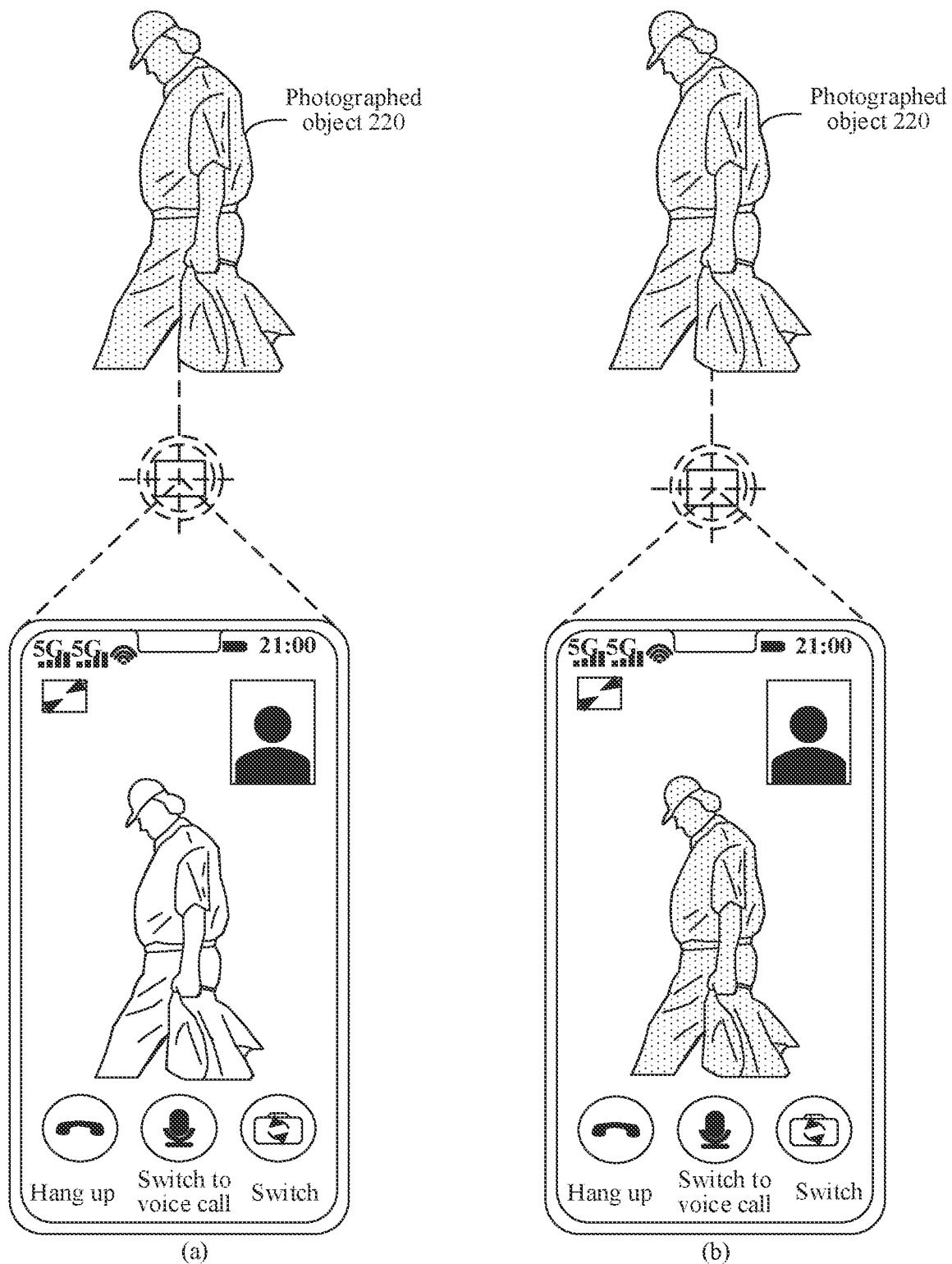
FIG. 4 is a schematic diagram of an application scenario applicable to an embodiment of this application.

The following exemplarily describes an application scenario of the white balance processing method according to this embodiment of this application with reference to FIG. 3 and FIG. 4.

Exemplarily, the white balance processing method in this embodiment of this application may be applicable to the field of photography, video recording, a video call, or other image processing. The color accuracy of an image can be improved through performing white balance processing on the image through the white balance processing method according to the embodiment of this application.

Application Scenario One: The Field of Photography

As shown in FIG. 3, when photographing under a dark light scenario (for example, a night scene embodiment), the light entering amount of the electronic device is small, leading to a relatively low signal-to-noise ratio of the image. Existing white balance processing, that is, a white balance algorithm based on a single-frame image, is prone to error, resulting in obvious color distortion existing in an acquired image. (a) in FIG. 3 shows a preview image of a photographed object 210 obtained by using the existing white balance processing method. (b) in FIG. 3 shows a preview image of the photographed object 210 obtained through the white balance processing method according to this embodiment of this application. Compared with the preview image shown in (a) in FIG. 3, the preview image shown in (b) in FIG. 3 has a higher degree of color restoration of the photographed object 210. Therefore, the color accuracy of an image can be improved through performing white balance processing on the image through the white balance processing method according to the embodiment of this application.

Application Scenario Two: Video Call

As shown in FIG. 4, (a) in FIG. 4 shows a preview image of a photographed object 220 in a video call by using the existing white balance processing method. (b) in FIG. 4 obtains a preview image of the photographed object 220 in the video call through the white balance processing method according the embodiment of this application. Compared with the preview image shown in (a) in FIG. 4, the preview image shown in (b) in FIG. 4 has a higher degree of color restoration of the preview image of the photographed object 220. Therefore, the color accuracy of an image can be improved through performing white balance processing on the image through the white balance processing method according to the embodiment of this application.

It is to be understood that, the foregoing describes by using examples of the application scenario, and does not constitute any limitation on the application scenario of this application.

Figure 5:
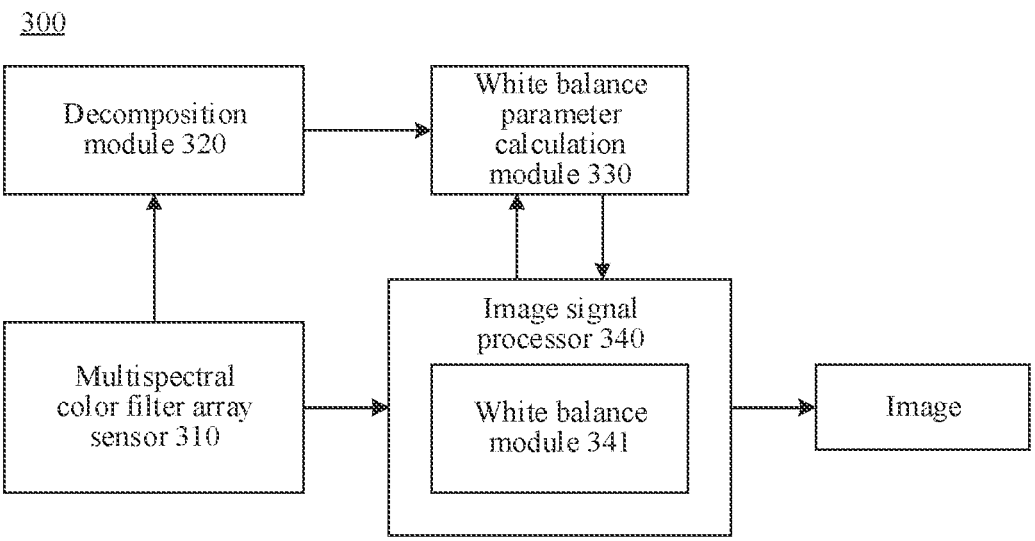
FIG. 5 is a schematic diagram of a system architecture applicable to a white balance processing method according to this application.
Figure 11:
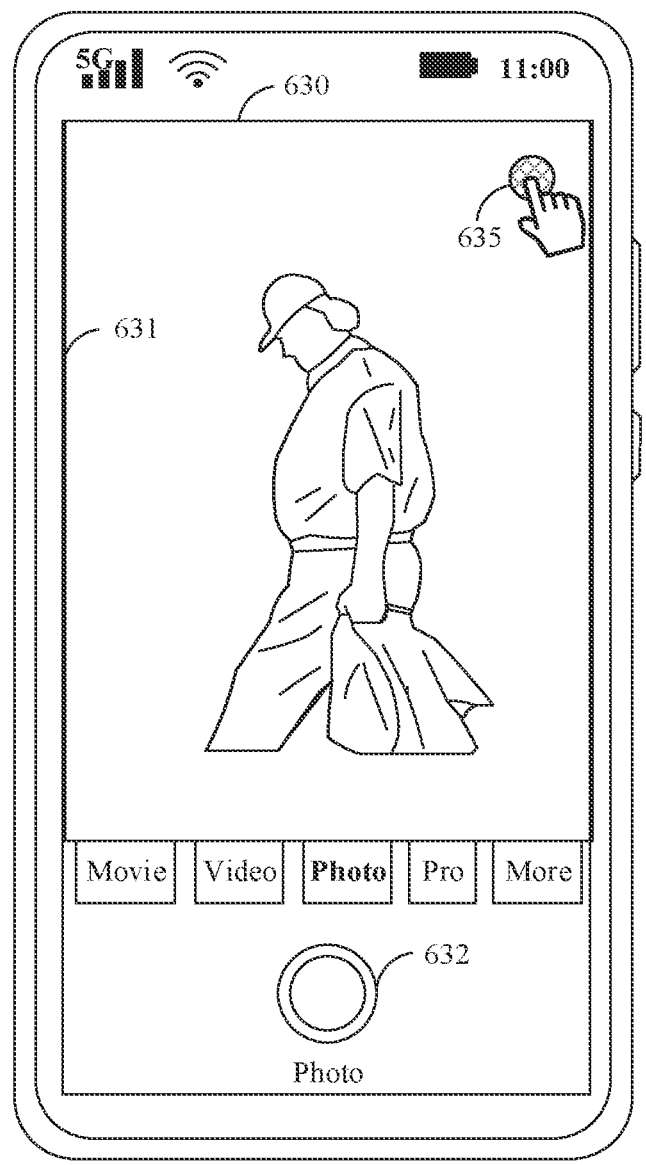
FIG. 11 is a schematic diagram of a display interface of an electronic device according to an embodiment of this application.

The following describes the white balance processing method according to the embodiments of this application in detail with reference to FIG. 5 and FIG. 11.

FIG. 5 is a schematic diagram of a system architecture applicable to the white balance processing method according to this application.

As shown in FIG. 5, the system architecture 300 includes a multispectral color filter array sensor 310, a decomposition module 320, a white balance parameter calculation module 330, and an image signal processor 340. The image signal processor 340 may further include a white balance module 341.

Exemplarily, the multispectral color filter array sensor 310 may be configured to obtain a Raw image. For example, the Raw image captured by the multispectral color filter array sensor 310 may include an RGB color mode and another color mode.

Exemplarily, the Raw image captured by the multispectral color filter array sensor 310 may refer to an RGBCYM image, or, an RGBCYGM image, or an image in the another color mode.

In an example, the Raw image obtained by the multispectral color filter array sensor 310 may be an RGBCMY image, where R represents red (red), G represents green (green), B represents blue (blue), C represents cyan (cyan), M represents mayenta (mayenta), and Y represents yellow (yellow).

In an example, the Raw image obtained by the multispectral color filter array sensor 310 may be the RGBCYGM image, where R represents red (red), G represents green (green), B represents blue (blue), C represents cyan (cyan), Y represents yellow (yellow), and M represents mayenta (mayenta).

It is to be understood that, the foregoing describes by using the RGBCMY image and the RGBCYGM image as examples, which is not limited in this application.

Exemplarily, the Raw image obtained by the multispectral color filter array sensor 310 may be an image with multiple channels, for example, a Raw image with 6 channels, a Raw image with 8 channels, or a Raw image with another quantity of channels.

It is to be understood that, the Raw image captured by the multispectral color filter array sensor may be decomposed into an image in an RGB color mode and an image in another color mode, and the spectral response curves of the two images satisfy that any two curves are different.

Figure 6:
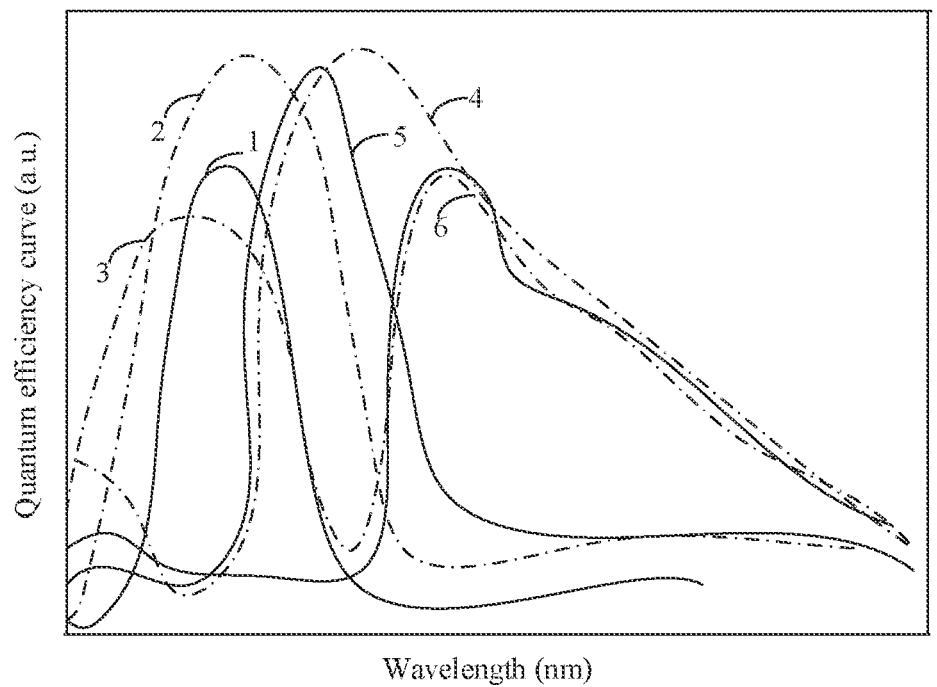
FIG. 6 is a schematic diagram of spectral response curves of a multispectral image according to this application.

For example, FIG. 6 shows spectral response curves of an RGBCMY image with 6 channels, where curve 1 represents a spectral response curve corresponding to blue (blue, B); curve 2 represents a spectral response curve corresponding to cyan (cyan, C); curve 3 represents a spectral response curve corresponding to mayenta (mayenta, M); curve 4 represents a spectral response curve corresponding to yellow (yellow, Y); curve 5 represents a spectral response curve corresponding to green (green, G), and curve 6 represents a spectral response curve corresponding to red (red, R). In the spectral response curves of the RGBCMY image shown in FIG. 6, curve 6 corresponds to curve 3, curve 5 corresponds to curve 4, and curve 1 corresponds to curve 2 respectively. As can be seen from FIG. 6, a spectral range of curve 3 is wider than that of curve 6, and a light input amount of curve 3 is better than that of curve 6; a spectral range of curve 4 is wider than that of curve 5, and a light input amount of curve 4 is better than that of curve 5; and a spectral range of curve 2 is wider than that of curve 1, and a light input amount of curve 2 is better than that of curve 1.

Exemplarily, the decomposition module 320 is configured to decompose the Raw image captured by the multispectral color filter array sensor 310 into a first Bayer pattern image and a second Bayer pattern image, where the first Bayer pattern image may refer to a Bayer pattern image in a first color mode (for example, an RGB color mode), and the second Bayer pattern image may refer to a Bayer pattern image in a second color mode (for example, a CYM color mode, a CYGM color mode, or another color mode).

It should be understood that, any two curves in the spectral response curves of the first Bayer pattern image and the spectral response curves of the second Bayer pattern image are different.

Exemplarily, the decomposition module 320 may first perform demosaicing (demosaic) processing, and then perform resizing (resize) processing on the Raw image captured by the multispectral color filter array sensor. For example, the sizes of the first Bayer pattern image and the second Bayer pattern image may be 68*48*3.

Optionally, the first Bayer pattern image may refer to an image in the RGB color mode; and the second Bayer pattern image may refer to an image in the another color mode. For example, the second Bayer pattern image may refer to an image in the CMY color mode; or the second Bayer pattern image may refer to an image in the CYGM color mode.

Exemplarily, the Raw image captured by the multispectral color filter array sensor 310 may be an image with multiple channels; and the image with multiple channels may be classified into a first Bayer pattern image (for example, the RGB color mode) with 3 channels and a second Bayer pattern image with another quantity of channels.

Optionally, the Raw image captured by the multispectral color filter array sensor 310 may be an RGBCMY image with 6 channels, which may be decomposed into the first Bayer pattern image (an RGB image) with 3 channels and a second Bayer pattern image (a CMY image) with 3 channels.

Optionally, the Raw image captured by the multispectral color filter array sensor 310 may be an RGBCYGM image with 7 channels, which may be decomposed into the first Bayer pattern image (the RGB image) with 3 channels and a second Bayer pattern image (a CYGM image) with 4 channels.

Optionally, the Raw image captured by the multispectral color filter array sensor 310 may be a Raw image with 8 channels, which may be decomposed into the first Bayer pattern image (the RGB image) with 3 channels and a second Bayer pattern image with 5 channels.

It is to be understood that, the foregoing describes the Raw image captured by the multispectral color filter array sensor 310 by using examples, which is not limited in this application.

Figure 7:
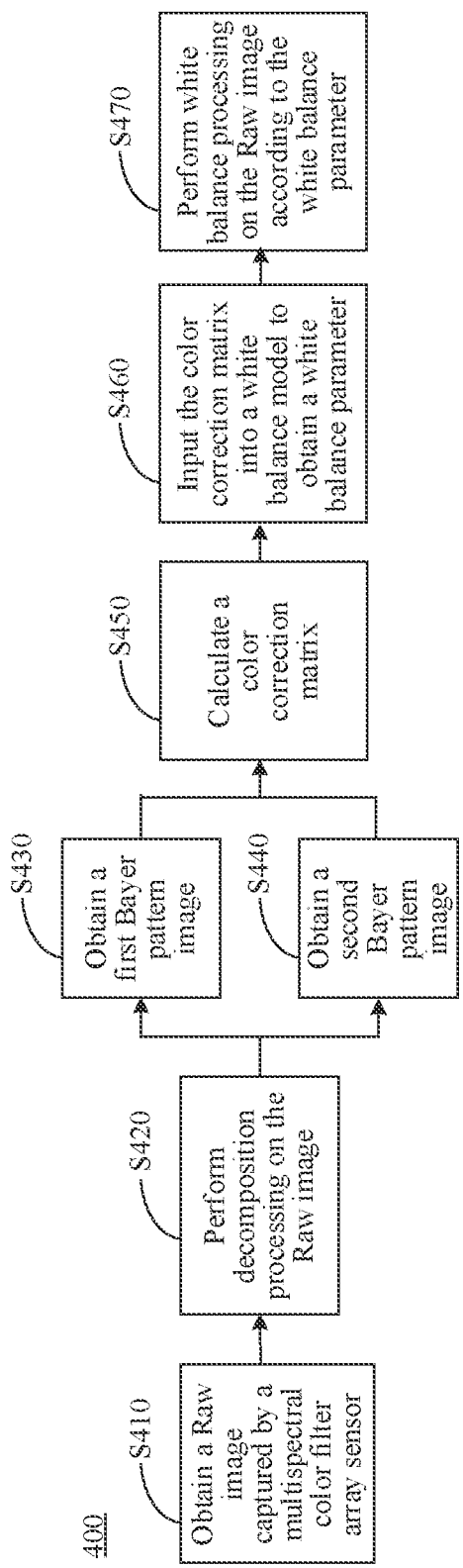
FIG. 7 is a schematic diagram of a white balance processing method applicable to this application.

Exemplarily, the white balance parameter calculation module 330 is configured to calculate a white balance parameter according to the first Bayer pattern image and the second Bayer pattern image, and a specific process may refer to steps S430 to S450 shown in subsequent FIG. 7.

Optionally, the white balance parameter calculation module 330 may further transmit the obtained white balance parameter to the image signal processor 340.

Exemplarily, after the image signal processor 340 obtains the white balance parameter, the white balance module 341 may perform white balance processing on the image captured by the multispectral color filter array sensor 310 according to the white balance parameter to obtain a processed image.

For example, the white balance module 341 may perform automatic white balance processing (automatic white balance, AWB) on the image captured by the multispectral color filter array sensor 310 according to the white balance parameter.

Optionally, the white balance parameter calculation module 330 may be a module in a CPU, a GPU, or another hardware with computility; or, the white balance parameter calculation module 330 may be a module in the image signal processor 340; or, a function of the white balance parameter calculation module 330 may alternatively be performed in the white balance module 341.

It should be noted that, the system architecture shown in FIG. 5 may be the system architecture in the electronic device shown in FIG. 2; and the system architecture shown in FIG. 5 may perform a white balance processing method shown in FIG. 7, and the white balance processing method shown in FIG. 7 are described in detail below.

FIG. 7 is a schematic diagram of a white balance processing method according to an embodiment of this application. The method 400 includes steps S410 to S470, and steps S410 to S470 are described in detail below.

Step S410: Obtain a Raw image (an example of a first image) captured by a multispectral color filter array sensor. The Raw image refers to the Raw image captured by the multispectral color filter array sensor 310 shown in FIG. 5.

For example, a Raw image with 6 channels may be captured by the multispectral color filter array sensor 310, and the Raw image may include an RGB color mode and another color mode.

It is to be understood that, the color filter array sensor refers to a sensor covering a mosaic color filter array on a pixel sensor, and is used for collecting color information of the image. A Raw image with more channels may be obtained through the color filter array sensor. A spectral range of the spectral response curves of the Raw image captured by the color filter array sensor is wider, that is, the light input amount of the color filter array sensor is larger, which makes a better brightness value of the image.

Step S420: Perform decomposition processing on the Raw image.

Optionally, the decomposition processing is performed on the Raw image captured by the multispectral color filter array sensor.

Exemplarily, two Bayer pattern images, a first Bayer pattern image and a second Bayer pattern image respectively, are extracted from a preset position of the Raw image.

Step S430: Obtain the first Bayer pattern image.

Optionally, the first Bayer pattern image is obtained according to the decomposition processing.

Step S440: Obtain the second Bayer pattern image.

Optionally, the second Bayer pattern image is obtained according to the decomposition processing.

Exemplarily, corresponding pixels (pixel) may be extracted according to an RGB mask (mask) of the Raw image to compose an RGGB Bayer pattern image to obtain a first sample Bayer pattern image; and corresponding pixels (pixel) may be extracted according to a CYM mask (mask) of the Raw image to compose a CYYM Bayer pattern image to obtain a second sample Bayer pattern image.

Exemplarily, the corresponding pixels (pixel) may be extracted according to the RGB mask (mask) of the Raw image to compose the RGGB Bayer pattern image to obtain the first sample Bayer pattern image; and corresponding pixels (pixel) may be extracted according to a CYGM mask (mask) of the Raw image to compose a CYGM Bayer pattern image to obtain a second sample Bayer pattern image.

It is to be understood that, the first Bayer pattern image refers to the RGGB image, and the second Bayer pattern image may refer to the CYYM image, the CYGM image, or an image in another color mode. The second Bayer pattern image and the first Bayer pattern image satisfy that any two curves in the spectral response curves are different, and the color mode of the second Bayer pattern image is not limited in this application.

Step S450: Calculate a color correction matrix.

Optionally, the color correction matrix is calculated according to the first Bayer pattern image and the second Bayer pattern image.

Exemplarily, demosaicing processing may be performed on the first Bayer pattern image and the second Bayer pattern image to obtain an image (an example of a second image) in a first color mode and an image (an example of a third image) in a second color mode. The color correction matrix may be obtained according to a pixel difference between the image in the first color mode and the image in the second color mode, where the color correction matrix is used for representing a pixel change amount of transforming the image in the first color mode into the image in the second color mode.

For example, the first Bayer pattern image is the RGGB image, and the second Bayer pattern image is the CMMY image; the image in the first color mode may be an RGB image, and the image in the second color mode may be a CMY image; each pixel in the RGB image may correspond to one group of RGB value (an example of a first pixel, a second pixel, and a third pixel), and each pixel in the CMY image may correspond to one group of CMY value (an example of a fourth pixel, a fifth pixel, and a sixth pixel); a 3×1 matrix (an example of a first vector) may be obtained by transforming the RGB value corresponding to an R pixel into the CMY value corresponding to a C pixel; similarly, a 3×1 matrix (an example of a second vector) may be obtained by transforming the RGB value corresponding to a G pixel into the CMY value corresponding to a M pixel; a 3×1 matrix (an example of a third vector) may be obtained by transforming the RGB value corresponding to a B pixel into the CMY value corresponding to a Y pixel; and a 3×3 color correction matrix is obtained through the 3 one dimensional matrixes.

Step S460. Input the color correction matrix into a white balance model to obtain a white balance parameter.

The white balance model may obtain the corresponding white balance parameter according to the inputted color correction matrix. The white balance model may be a pretrained fully connected neural network, and a training method of the white balance model may refer to the subsequent FIG. 8.

It is to be understood that, the white balance parameter may refer to color information of a light source. For example, the white balance parameter may refer to an RGB value of the light source. The influence of the light source on the color of a photographed object may be eliminated by applying the color information of the light source to the image, thereby avoiding color distortion of the photographed object. The color information of the photographed object in the image may be modified according to the color information of the light source, thereby improving color accuracy of the photographed object in the image.

Step S470: Perform white balance processing on the Raw image according to the white balance parameter.

Optionally, the white balance processing (an example of image processing) is performed on the Raw image according to the white balance parameter to obtain a processed image (an example of a fourth image).

In this embodiment of this application, the first image is captured through the multispectral color filter array sensor, and the second image and the third image in different color modes may be obtained through performing the decomposition processing and the demosaicing processing on the first image. The color correction matrix may be obtained according to the second image and the third image, and the white balance parameter may be obtained by inputting the color correction matrix into the white balance model. The fourth image is obtained by performing the image processing on the first image through the white balance parameter. Because the color information in the image (for example, a Raw image with 6 channels) captured by the multispectral color filter array sensor is more than the color information of a single-frame image (for example, an image with 3 channels), the white balance parameter obtained through the first image can improve the accuracy of the white balance processing and the color accuracy of the image.

Figure 8:
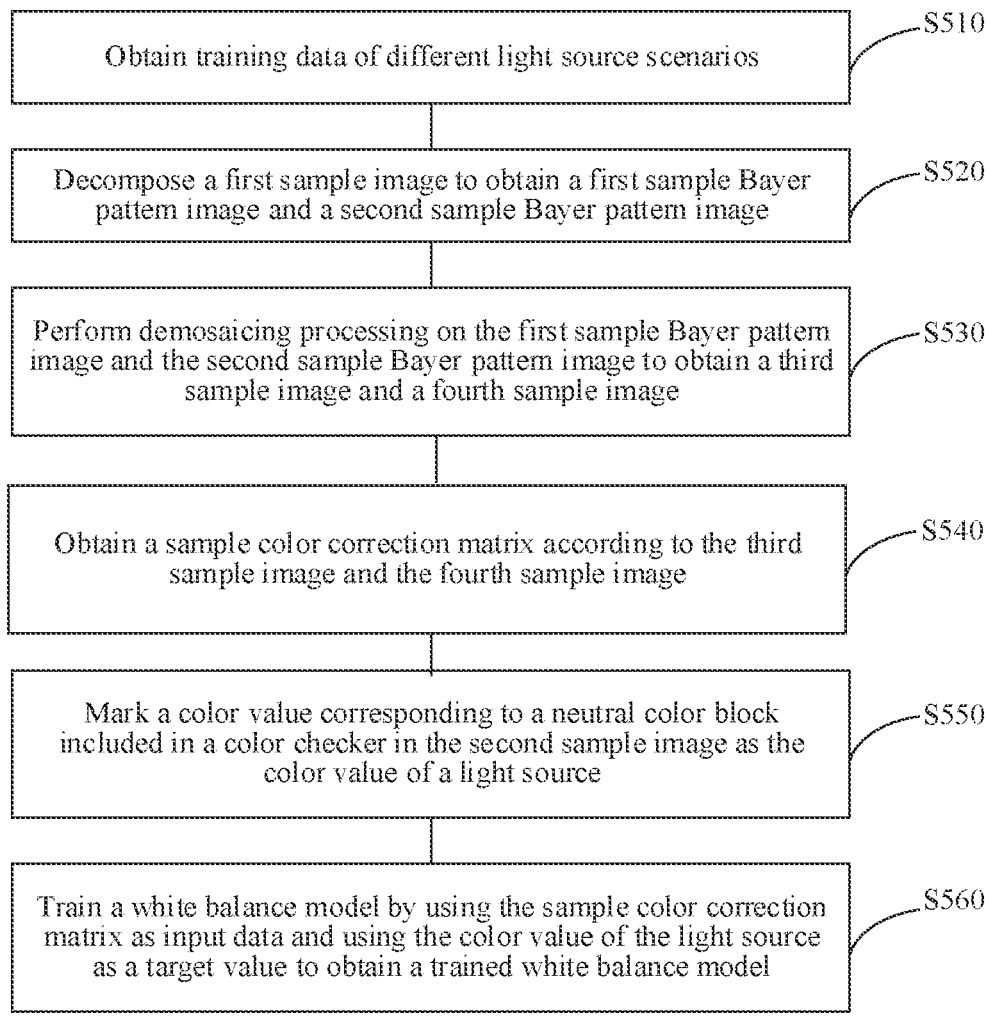
FIG. 8 is a schematic diagram of a training method of a white balance model according to an embodiment of this application.

FIG. 8 is a schematic diagram of a training method of a white balance model according to an embodiment of this application. The training method may be performed by the electronic device shown in FIG. 2. The training method 500 may include steps S510 to S560, and steps S510 to S560 are described in detail respectively below.

Step S510: Obtain training data of different light source scenarios.

Optionally, for the same photographing scenario, the training data may include a first sample image without a color checker and a second sample image with a color checker in the same light source scenario, and the second sample image is used for marking ground truths (Ground truth) of different light sources.

It should be noted that, the color checker may be disposed under the illumination of a main light source for photographing during obtaining the sample image.

Optionally, for scenarios of a color flash and a color cast, automatic white balance of the current scenarios is relatively poor; and the capturing of the sample image may be performed focusing on the scenarios.

Step S520: Decompose the first sample image to obtain a first sample Bayer pattern image and a second sample Bayer pattern image.

Exemplarily, corresponding pixels (pixel) may be extracted according to an RGB mask (mask) of the first sample image to compose an RGGB Bayer pattern image to obtain the first sample Bayer pattern image; and corresponding pixels (pixel) may be extracted according to a CYM mask (mask) of the first sample image to compose a CYYM Bayer pattern image to obtain the second sample Bayer pattern image.

Exemplarily, the corresponding pixels (pixel) may be extracted according to the RGB mask (mask) of the first sample image to compose the RGGB Bayer pattern image to obtain the first sample Bayer pattern image; and corresponding pixels (pixel) may be extracted according to a CYGM mask (mask) of the first sample image to compose a CYGM Bayer pattern image to obtain the second sample Bayer pattern image.

It is to be understood that, the first sample Bayer pattern image may refer to the RGGB image, and the second sample Bayer pattern image may refer to the CYYM image, the CYGM image, or an image in another color mode. The second sample Bayer pattern image and the first sample Bayer pattern image satisfy that any two curves in the spectral response curves are different, and the color mode of the second sample Bayer pattern image is not limited in this application.

Step S530: Perform demosaicing processing on the first sample Bayer pattern image and the second sample Bayer pattern image to obtain a third sample image and a fourth sample image.

The third sample image may refer to an image in a first color mode, and the fourth sample image may refer to an image in a second color mode.

For example, the first color mode may refer to an RGB color mode, and the second color mode may refer to a CMY color mode; or, the second color mode may further refer to an image in another color mode.

Exemplarily, the first sample Bayer pattern image may be the RGGB image, and the demosaicing processing is performed on the RGGB image to obtain an RGB image; and the second sample Bayer pattern image may be the CYYM image, and the demosaicing processing is performed on the CYYM image to obtain a CYM image.

Exemplarily, the first sample Bayer pattern image may be the RGGB image, and the demosaicing processing is performed on the RGGB image to obtain the RGB image; and the second sample Bayer pattern image may be the CYGM image, and the demosaicing processing is performed on the CYGM image to obtain a CYGM image.

Step S540: Obtain a sample color correction matrix according to the third sample image and the fourth sample image.

For example, the sample color correction matrix may be obtained through transforming a pixel in the third sample image into a pixel in the fourth sample image.

Exemplarily, the third sample image may be the RGB image, and the fourth sample image may be the CMY image; each pixel in the RGB image may correspond to one group of RGB value, and each pixel in the CMY image may correspond to one group of CMY value; a 3×1 matrix may be obtained by transforming the RGB value corresponding to an R pixel into the CMY value corresponding to a C pixel; similarly, a 3×1 matrix may be obtained by transforming the RGB value corresponding to a G pixel into the CMY value corresponding to a M pixel; a 3×1 matrix may be obtained by transforming the RGB value corresponding to a B pixel into the CMY value corresponding to a Y pixel; and a 3×3 sample color correction matrix is obtained through the 3 one dimensional matrixes.

Optionally, to facilitate the training of a white balance model, the 3×3 sample color correction matrix may be reorganized to obtain a one-dimensional vector, that is, a 9×1 sample color correction matrix.

Step S550: Mark a color value corresponding to a neutral color block included in the color checker in the second sample image as the color value of the light source.

It is to be understood that, a neutral material of a neutral color block reflects light with various wavelengths uniformly. Therefore, any color of light that shines on the neutral color block reflects the light of that color. For example, red light that shines on the neutral color block of the color checker reflects the red light, or green light that shines on the neutral color block of the color checker reflects the green light. Therefore, a neutral color checker of the color checker may be used for marking the color of the light source.

Exemplarily, the neutral color block may refer to a gray color block in the color checker. For example, an RGB pixel value of the gray color block in a target image is marked as a light source color of the light source, that is, the RGB pixel value of the light source.

Exemplarily, a marking process of the color value of the light source includes the following steps:

Step one: Decompose the second sample image to obtain a third sample Bayer pattern image (an RGGB Bayer pattern image) and a fourth sample Bayer pattern image.

Step two: Perform the demosaicing processing on the third sample Bayer pattern image and the fourth sample Bayer pattern image to obtain an RGB image (an example of a fifth sample image) and an image in another color mode.

Step three: Mark the RGB pixel value corresponding to the neutral color block of the color checker included in the RGGB image as the color value (an example of first pixel information) of the light source.

Exemplarily, the neutral color block may refer to a gray color block in the color checker. For example, an RGB pixel value of the gray color block in a target image is marked as a light source color of the light source, that is, the RGB pixel value of the light source.

Optionally, in a possible implementation, demosaic algorithm processing may be performed on the second sample image to obtain a processed image; and a pixel value of RGB in the pixel value corresponding to the neutral color block of the color checker is obtained in the processed image.

Step S560: Train the white balance model by using the sample color correction matrix as input data and using the color value of the light source as a target value to obtain a trained white balance model.

Exemplarily, the white balance model is inputted into the sample color correction matrix to obtain a predicted white balance parameter (an example of predicted pixel information); the color value of the light source is compared according to the predicted white balance parameter; and iteration is performed on the parameter of the white balance model through a back propagation algorithm until the white balance model is converged to obtain the trained white balance model.

For example, the white balance model may be trained through back iteration using an angular error loss (Angular Error Loss) between the predicted white balance parameter and the color value of the light source.

Optionally, the white balance model in this embodiment of this application may be a fully connected neural network.

In this embodiment of this application, the first sample image without the color checker and the second sample image with the color checker are captured through the multispectral color filter array sensor under a same light source and a same scenario. The input data for training the white balance model may be obtained through processing the first sample image. The target data for training the white balance model may be obtained through the second sample image. The trained white balance model obtained through the training method of the white balance model according to the embodiment of this application may be used for white balance processing, and the white balance processing may be performed on the Raw image captured by the multispectral color filter array sensor according to the white balance parameter outputted by the white balance model. In this embodiment of this application, because the training data of training the white balance model is the image captured by the multispectral color filter array sensor, and the color information in the image (for example, a Raw image with 6 channels) captured by the multispectral color filter array sensor is more than the color information of a single-frame image (for example, an image with 3 channels), the parameter used for white balance processing outputted by the trained white balance model can improve the accuracy of the white balance processing and the color accuracy of the image.

Figure 9:
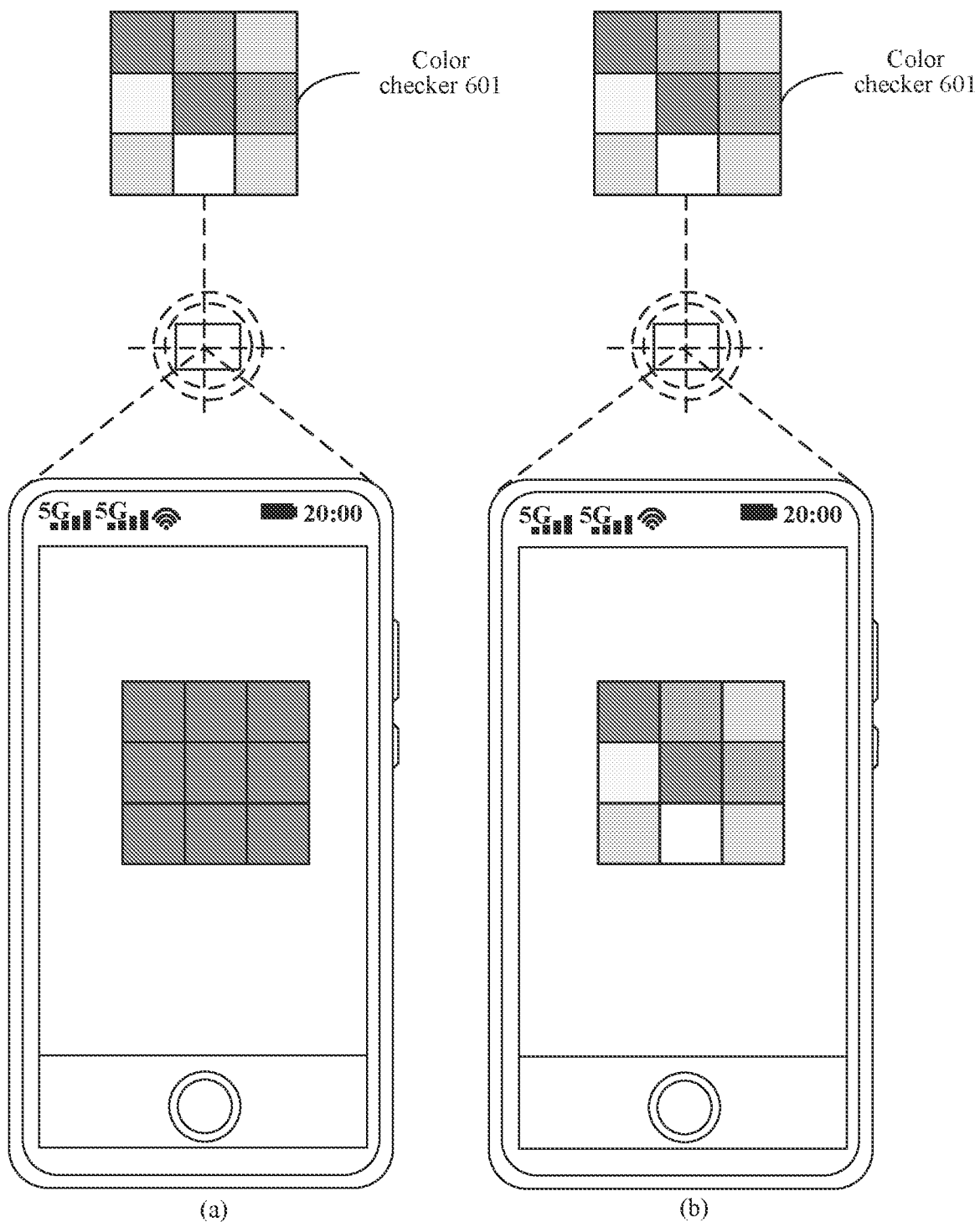
FIG. 9 is a schematic diagram of an effect of a white balance processing method according to an embodiment of this application.

FIG. 9 is a schematic diagram of an effect of a white balance processing method according to an embodiment of this application.

As shown in FIG. 9, (a) in FIG. 9 is an output image obtained through a white balance processing method in the related art. (b) in FIG. 9 is an output image obtained through the white balance processing method according to this embodiment of this application. Severe distortion appearing in colors of a color checker 601 may be seen from a preview image shown in (a) in FIG. 9. Compared with the preview image shown in (a) in FIG. 9, a preview image shown in (b) in FIG. 9 has a higher degree of color restoration of the color checker 601. That is, the color accuracy of an image can be improved through performing white balance processing on the image through the white balance processing method according to this embodiment of this application.

In an embodiment, a color restoration mode may be turned on in a camera application program of an electronic device, then the white balance parameter may be obtained in the electronic device through the white balance model according to this embodiment of this application, and the white balance processing may be performed on the Raw image captured by the multispectral color filter array sensor according to the white balance parameter, thereby outputting a processed image or video.

Figure 10A:
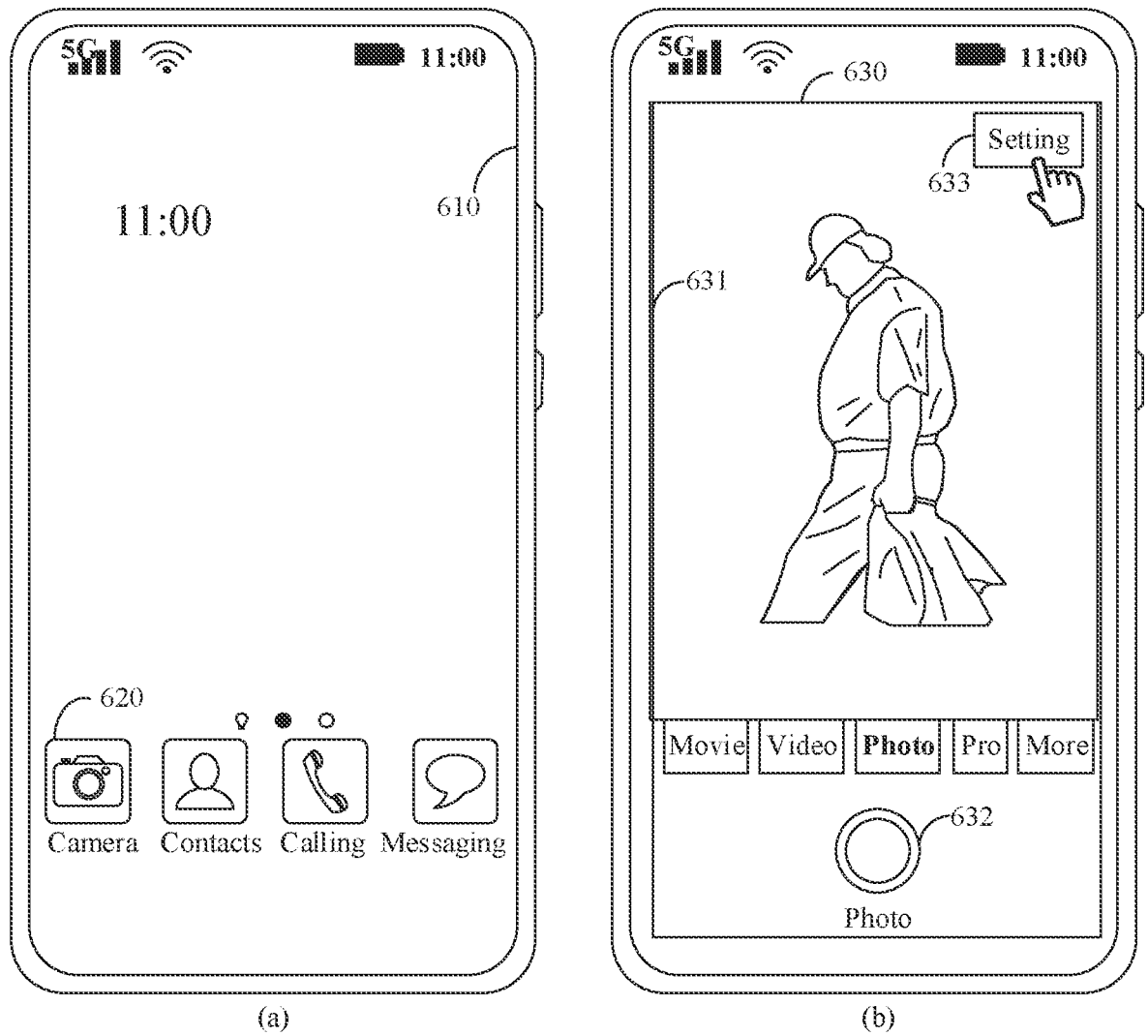
FIG. 10A and FIG. 10B are a schematic diagram of a display interface of an electronic device according to an embodiment of this application.
Figure 10B:
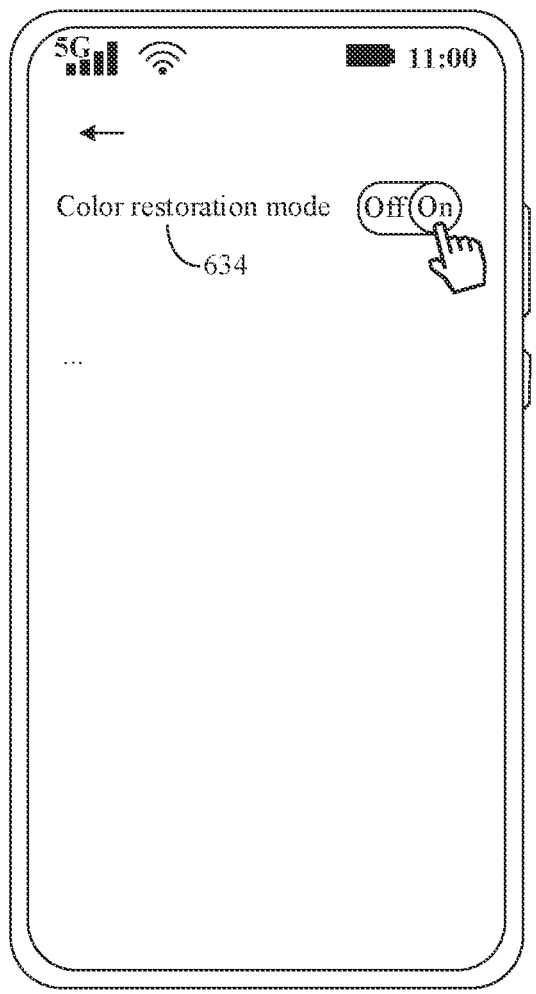

FIG. 10A and FIG. 10B show a graphical user interface (graphical user interface, GUI) of an electronic device.

The GUI shown in (a) in FIG. 10A is a desktop 610 of the electronic device. When detecting an operation that a user taps an icon 620 of a camera application (application, APP) on the desktop 610, the electronic device may start the camera application, and display another GUI shown in (b) in FIG. 10A. The GUI shown in (b) in FIG. 10A may be a display interface under a photographing mode of the camera APP, and the GUI may include a photographing interface

630. The photographing interface 630 may include a viewfinder frame 631 and a control. For example, the photographing interface 630 may include a control 632 for instructing photographing and a control 633 for instructing setting. In a preview state, the viewfinder frame 631 may display a preview image in real time. The preview state may refer to a state when a user turns on the camera and does not press a photo/video button. In this case, the viewfinder frame may display the preview image in real time.

After the electronic device detects an operation of clicking and setting the control 633 by the user, a setting interface shown in (c) in FIG. 10B is displayed. The setting interface may include a color restoration mode control 634. After detecting an operation of clicking the color restoration mode control 634 by the user, a color restoration mode may be turned on in the electronic device. After the color restoration mode may be turned on in the electronic device, a white balance parameter may be obtained through the white balance model according to this embodiment of this application, and white balance processing may be performed on a Raw image captured by a multispectral color filter array sensor according to the white balance parameter, thereby outputting a processed image.

In an embodiment, under a photographing mode shown in FIG. 11, the photographing interface 630 may further include a control 635, and the control 635 is configured to instruct to turn on/off the color restoration mode. After the electronic device detects an operation of clicking the control 635 by the user, the color restoration mode may be turned on in the electronic device, the white balance parameter may be obtained through the white balance model according to this embodiment of this application, and the white balance processing may be performed on the Raw image captured by the multispectral color filter array sensor according to the white balance parameter, thereby outputting a processed image or video.

It is to be understood that, the foregoing exemplary description with examples is merely intended to help a person skilled in the art to understand the embodiments of this application, and is not intended to limit the embodiments of this application to specific values or specific scenarios in the example. Obviously, a person skilled in the art may make various equivalent modifications or variations according to the foregoing exemplary description. The modifications or variations also fall with the scope of the embodiments of this application.

The training method of the white balance model and the white balance processing method according to the embodiments of this application are described above in detail with reference to FIG. 1 to FIG. 11. An apparatus embodiment of this application is described in detail below with reference to FIG. 12 to FIG. 14. It is to be understood that, the apparatus in this embodiment of this application may perform the methods in the foregoing embodiments of this application, that is, for specific working processes of the following products, refer to corresponding processes in the foregoing method embodiments.

Figure 12:
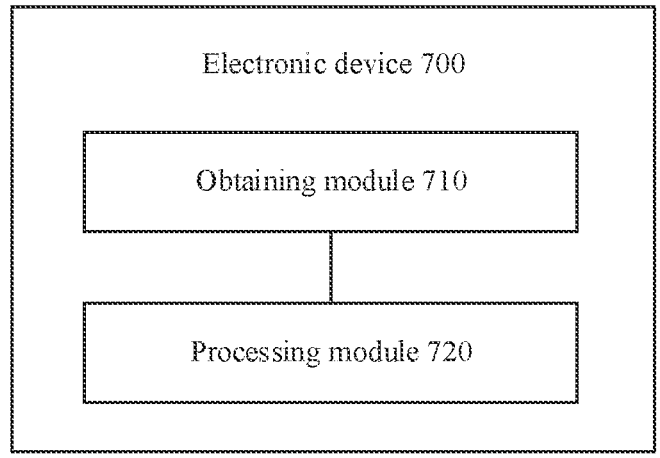
FIG. 12 is a schematic structural diagram of an electronic device according to an embodiment of this application.

FIG. 12 is a schematic structural diagram of an electronic device according to an embodiment of this application. The electronic device 700) may perform the training method shown in FIG. 8. The electronic device 700 includes an obtaining module 710 and a processing module 720.

The obtaining module 710 is configured to obtain training data, where the training data includes a first sample image and a second sample image, the first sample image and the second sample image refer to images of a first color space captured by a multispectral color filter array sensor under a same light source scenario, and the second sample image includes a color checker. The processing module 720 is configured to perform decomposition processing and demosaicing processing on the first sample image to obtain a third sample image and a fourth sample image, where the third sample image is an image in a first color mode and the fourth sample image is an image in a second color mode. A sample color correction matrix is obtained according to the third sample image and the fourth sample image, where the sample color correction matrix is used for representing a pixel change amount of transforming the third sample image into the fourth sample image. The decomposition processing and the demosaicing processing are performed on the second sample image to obtain a fifth sample image, where the fifth sample image is an image in the first color mode. A white balance model is trained by using the sample color correction matrix as input data and using first pixel information in the fifth sample image as target data to obtain a trained white balance model, where the white balance model is used for calculating a parameter of white balance processing, and the first pixel information refers to a pixel value corresponding to a neutral color block included in the color checker in the fifth sample image.

Optionally, as an embodiment, the processing module 720 is specifically configured to:

input the sample color correction matrix into the white balance model to obtain predicted pixel information; and train the white balance model according to the predicted pixel information and the first pixel information to obtain the trained white balance model.

Optionally, as an embodiment, the parameter of the trained white balance model is obtained through iteration using a back propagation algorithm according to a difference between the predicted pixel information and the first pixel information.

Optionally, as an embodiment, the multispectral color filter array sensor refers to a sensor covering a mosaic color filter array on a pixel sensor.

Optionally, as an embodiment, the white balance model is a fully connected neural network.

It should be noted that, the foregoing electronic device 700 is embodied in the form of functional modules. The term "module" may be implemented through the form of software and/or hardware, which is not specifically limited.

For example, the "module" may be a software program, a hardware circuit, or a combination of the two, to implement the foregoing functions. The hardware circuit may include an application specific integrated circuit (application specific integrated circuit, ASIC), an electronic circuit, a processor (for example, a shared processor, a dedicated processor, or a packet processor) configured to execute one or more software or firmware programs, a memory, a combined logical circuit, and/or another suitable component that supports the described functions.

Figure 13:
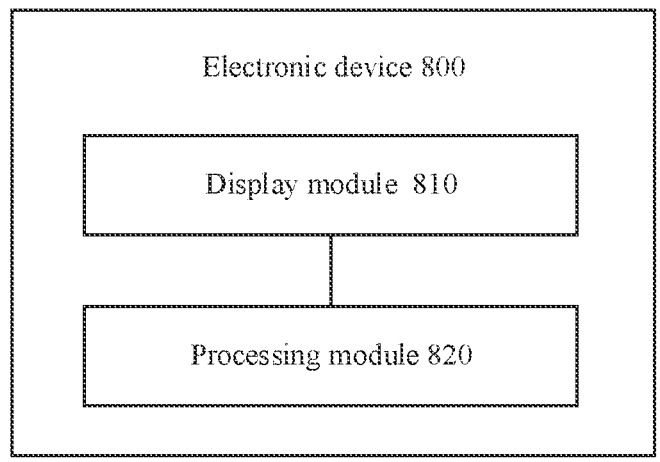
FIG. 13 is a schematic structural diagram of an electronic device according to an embodiment of this application.

FIG. 13 is a schematic structural diagram of an electronic device according to an embodiment of this application. The electronic device 800 may perform the white balance processing method shown in FIG. 7. The electronic device 800 includes a display module 810 and a processing module 820.

The display module 810 is configured to display a first interface, where the first interface includes a first control. The processing module 820 is configured to detect a first operation on the first control; obtain a first image in response to the first operation, where the first image refers to an image of a first color space captured by a multispectral color filter array sensor; perform decomposition processing and demosaicing processing on the first image to obtain a second image and a third image, where the second image is an image in a first color mode and the third image is an image in a second color mode; obtain a color correction matrix according to the second image and the third image, where the color correction matrix is used for representing a pixel change amount of transforming the second image into the third image; input the color correction matrix into a white balance model to obtain a white balance parameter; and perform image processing on the first image according to the white balance parameter to obtain a fourth image, where the white balance model is used for calculating a parameter of white balance processing, the white balance model is obtained through training using a sample color correction matrix as input data and first pixel information as target data, the sample color correction matrix is obtained according to a third sample image and a fourth sample image, the sample color correction matrix is used for representing a pixel change amount of transforming the third sample image into the fourth sample image, the third sample image and the fourth sample image are obtained by performing the decomposition processing and the demosaicing processing on a first sample image, the first pixel information refers to a pixel value corresponding to a neutral color block included in a color checker in a fifth sample image, the fifth sample image is obtained by performing the decomposition processing and the demosaicing processing on a second sample image, the first sample image and the second sample image refer to images of the first color space captured by the multispectral color filter array sensor under a same light source scenario, and the second sample image includes the color checker.

Optionally, as an embodiment, the processing module 820 is specifically configured to:

perform the decomposition processing on the first image to obtain a first Bayer pattern image and a second Bayer pattern image, where the first Bayer pattern image is a Bayer pattern image in the first color mode and the second Bayer pattern image is a Bayer pattern image in the second color mode;

perform the demosaicing processing on the first Bayer pattern image to obtain the second image; and perform the demosaicing processing on the second Bayer pattern image to obtain the third image.

Optionally, as an embodiment, the second image includes a first pixel, a second pixel and a third pixel, the third image includes a fourth pixel, a fifth pixel and a sixth pixel, and the processing module 820 is specifically configured to:

obtain a first vector according to a difference between the first pixel and the fourth pixel;

obtain a second vector according to a difference between the second pixel and the fifth pixel;

obtain a third vector according to a difference between the third pixel and the sixth pixel; and compose the color correction matrix by the first vector, the second vector, and the third vector.

Optionally, as an embodiment, a parameter of the white balance model is obtained through iteration using a back propagation algorithm according to a difference between predicted pixel information and the first pixel information, and the predicted pixel information refers to output information obtained by inputting the sample color correction matrix into the white balance model.

Optionally, as an embodiment, the multispectral color filter array sensor refers to a sensor covering a mosaic color filter array on a pixel sensor.

Optionally, as an embodiment, the white balance model is a fully connected neural network.

Optionally, as an embodiment, the first interface refers to a main screen interface of the electronic device, the main screen interface comprises a camera application program, and the first control refers to a control corresponding to the camera application program.

Optionally, as an embodiment, the first interface refers to a photographing interface, and the first control refers to a control used for instructing to photograph.

Optionally, as an embodiment, the first interface refers to a video shooting interface, and the first control refers to a control used for instructing to shoot a video.

It should be noted that, the foregoing electronic device 800 is embodied in the form of functional modules. The term "module" may be implemented through the form of software and/or hardware, which is not specifically limited.

For example, the "module" may be a software program, a hardware circuit, or a combination of the two, to implement the foregoing functions. The hardware circuit may include an application specific integrated circuit (application specific integrated circuit, ASIC), an electronic circuit, a processor (for example, a shared processor, a dedicated processor, or a packet processor) configured to execute one or more software or firmware programs, a memory, a combined logical circuit, and/or another suitable component that supports the described functions.

Therefore, the units in the examples described in the embodiments in this application may be implemented by electronic hardware or a combination of computer software and electronic hardware. Whether the functions are executed by hardware or software depends on particular applications and design constraint conditions of the technical solutions. A person skilled in the art may use different methods to implement the described functions for each particular application, but it should not be considered that the implementation goes beyond the scope of this application.

Figure 14:
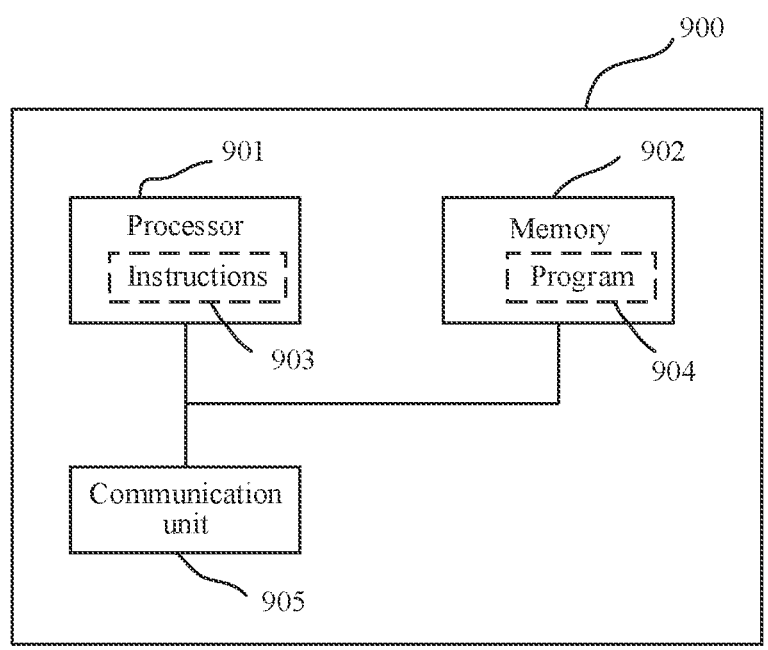
FIG. 14 is a schematic structural diagram of an electronic device according to an embodiment of this application.

FIG. 14 shows a schematic structural diagram of an electronic device according to this application. A dashed line in FIG. 14 indicates that the unit or the module is optional. The electronic device 900 may be configured to implement the method described in the foregoing method embodiments.

The electronic device 900 includes one or more processors 901, and the one or more processors 901 may support the electronic device 900 to implement the training method of the white balance model or the white balance processing method in the method embodiments. The processor 901 may be a general processor or a dedicated processor. For example, the processor 901 may be a central processing unit (central processing unit, CPU), a digital signal processor (digital signal processor, DSP), an application-specific integrated circuit (application specific integrated circuit, ASIC), a field programmable gate array (field programmable gate array, FPGA), or another programmable logic device, such as a discrete gate, a transistor logic device, or a discrete hardware component.

The processor 901 may be configured to control the electronic device 900, execute a software program, and process data of the software program. The electronic device 900 may further include a communication unit 905 configured to implement input (receiving) and output (transmitting) of a signal.

For example, the electronic device 900 may be a chip, and the communication unit 905 may be an input and/or output circuit of the chip, or, the communication unit 905 may be a communication interface of the chip, and the chip may be used as a component of a terminal device or another electronic device.

For another example, the electronic device 900 may be a terminal device, and the communication unit 905 may be a transceiver of the terminal device, or, the communication unit 905 may be a transceiver circuit of the terminal device.

The electronic device 900 may include one or more memories 902, storing a program 904, and the program 904 may be run by the processor 901 to generate instructions 903, causing the processor 901 to perform the training method or the white balance processing method described in the foregoing method embodiments according to the instructions 903.

Optionally, the memory 902 may be further store data. Optionally, the processor 901 may further read the data stored in the memory 902, and the data may be stored in the same storage address as the program 904, or the data may be stored in a different storage address with the program 904.

The processor 901 and the memory 902 may be provided separately, or may be integrated together, for example, integrated on a system on chip (system on chip, SOC) of the terminal device.

Exemplarily, the memory 902 may be configured to store the relevant program 904 of the training method of the white balance model provided in the embodiments of this application, and the processor 901 may be configured to invoke, when executing the training of the white balance model, the relevant program 904 of the training method of the white balance model stored in the memory 902 to perform the training method of the white balance model according to the embodiments of this application. For example, obtaining training data, where the training data includes a first sample image and a second sample image, the first sample image and the second sample image refer to images of a first color space captured by a multispectral color filter array sensor under a same light source scenario, and the second sample image includes a color checker; performing decomposition processing and demosaicing processing on the first sample image to obtain a third sample image and a fourth sample image, where the third sample image is an image in a first color mode and the fourth sample image is an image in a second color mode; obtaining a sample color correction matrix according to the third sample image and the fourth sample image, where the sample color correction matrix is used for representing a pixel change amount of transforming the third sample image into the fourth sample image; performing the decomposition processing and the demosaicing processing on the second sample image to obtain a fifth sample image, where the fifth sample image is an image in the first color mode; and training a white balance model by using the sample color correction matrix as input data and using first pixel information in the fifth sample image as target data to obtain a trained white balance model, where the white balance model is used for calculating a parameter of white balance processing, and the first pixel information refers to a pixel value corresponding to a neutral color block included in the color checker in the fifth sample image.

Exemplarily, the memory 902 may be configured to store the relevant program 904 of the white balance processing method provided in the embodiments of this application, and the processor 901 may be configured to invoke, when executing the white balance processing, the relevant program 904 of the white balance processing method stored in the memory 902 to perform the white balance processing method according to the embodiments of this application. For example: displaying a first interface, where the first interface includes a first control; detecting a first operation on the first control; obtaining a first image in response to the first operation, where the first image refers to an image of a first color space captured by a multispectral color filter array sensor; performing decomposition processing and demosaicing processing on the first image to obtain a second image and a third image, where the second image is an image in a first color mode and the third image is an image in a second color mode; obtaining a color correction matrix according to the second image and the third image, where the color correction matrix is used for representing a pixel change amount of transforming the second image into the third image; inputting the color correction matrix into a white balance model to obtain a white balance parameter; and performing image processing on the first image according to the white balance parameter to obtain a fourth image, where the white balance model is used for calculating a parameter of white balance processing, the white balance model is obtained through training using a sample color correction matrix as input data and first pixel information as target data, the sample color correction matrix is obtained according to a third sample image and a fourth sample image, the sample color correction matrix is used for representing a pixel change amount of transforming the third sample image into the fourth sample image, the third sample image and the fourth sample image are obtained by performing the decomposition processing and the demosaicing processing on a first sample image, the first pixel information refers to a pixel value corresponding to a neutral color block included in a color checker in a fifth sample image, the fifth sample image is obtained by performing the decomposition processing and the demosaicing processing on a second sample image, the first sample image and the second sample image refer to images of the first color space captured by the multispectral color filter array sensor under a same light source scenario, and the second sample image includes the color checker.

This application further provides a computer program product, where when the computer program product is executed by a processor 901, the training method or the white balance processing method described in any one of the method embodiments of this application is implemented.

The computer program product may be stored in a memory 902. For example, the computer program product may be a program 904, where the program 904 is finally transformed, after processing processes such as preprocessing, compiling, assembling, and linking, into an executable target file that can be executed by the processor 901.

This application further provides a computer-readable storage medium, storing a computer program. When the computer program is executed by a computer, the white balance processing method described in any one of the method embodiments of this application is implemented. The computer program may be a high-level language program, or may be an executable target program.

The computer-readable storage medium is, for example, a memory 902. The memory 902 may be a volatile memory or a non-volatile memory, or, the memory 902 may include a volatile memory and a non-volatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM), and is used as an external cache. Through illustrative but not limitative description, many forms of RAMs may be used, for example, a static RAM (static RAM, SRAM), a dynamic RAM (dynamic RAM, DRAM), a synchronous DRAM (synchronous DRAM, SDRAM), a double data rate SDRAM (double data rate SDRAM. DDR SDRAM), an enhanced SDRAM (enhanced SDRAM, ESDRAM), a synchlink DRAM (synchlink DRAM, SLDRAM), and a direct rambus RAM (direct rambus RAM, DR RAM).

It may be clearly understood by a person skilled in the art that, for the purpose of convenient and brief description, for a detailed working process and a generated technical effect of the foregoing apparatus and device, refer to a corresponding process and technical effect in the foregoing method embodiments, and details are not described herein again.

In the several embodiments provided in this application, the disclosed system, apparatus, and method may be implemented in other manners. For example, some features of the described method embodiment may be ignored or not performed. The described apparatus embodiment is merely exemplary. The unit division is merely logical function division and may be other division in actual implementation. A plurality of units or components may be combined or integrated into another system. In addition, the coupling between units and the coupling between components may be direct couplings, or may be indirect couplings. The foregoing couplings include connections in electrical, mechanical, or other forms.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In conclusion, the foregoing descriptions am merely exemplary embodiments of this application, and are not intended to limit the protection scope of this application. Any modification, equivalent replacement, improvement and the like made within the spirit and principle of this application shall fall within the protection scope of this application.

What is claimed is:

1. A white balance processing method, applicable to an electronic device, the method comprising:
   displaying a first interface, wherein the first interface comprises a first control;
   detecting a first operation on the first control;
   obtaining a first image in response to the first operation, wherein the first image is an image of a first color space captured by a multispectral color filter array sensor;
   performing decomposition processing and demosaicing processing on the first image to obtain a second image and a third image, wherein the second image is an image in a first color mode and the third image is an image in a second color mode;
   obtaining a color correction matrix according to the second image and the third image, wherein the color correction matrix represents a pixel change amount of transforming the second image into the third image;
   inputting the color correction matrix into a white balance model to obtain a white balance parameter; and
   performing image processing on the first image according to the white balance parameter to obtain a fourth image,
   wherein the white balance model calculates a parameter of white balance processing,
   wherein the white balance model is obtained through training using a sample color correction matrix as input data and first pixel information as target data,
   wherein the sample color correction matrix is obtained according to a third sample image and a fourth sample image, the sample color correction matrix represents a pixel change amount of transforming the third sample image into the fourth sample image, and the third sample image and the fourth sample image are obtained by performing the decomposition processing and the demosaicing processing on a first sample image,
   wherein the first pixel information is a pixel value corresponding to a neutral color block comprised in a color checker in a fifth sample image, the fifth sample image is obtained by performing the decomposition processing and the demosaicing processing on a second sample image, and
   wherein the first sample image and the second sample image are images of the first color space captured by the multispectral color filter array sensor under a same light source scenario, and the second sample image comprises the color checker.

2. The white balance processing method of claim 1, wherein performing decomposition processing and demosaicing processing on the first image to obtain the second image and the third image comprises:
   performing decomposition processing on the first image to obtain a first Bayer pattern image and a second Bayer pattern image, wherein the first Bayer pattern image is a Bayer pattern image in the first color mode and the second Bayer pattern image is a Bayer pattern image in the second color mode;
   performing demosaicing processing on the first Bayer pattern image to obtain the second image; and
   performing demosaicing processing on the second Bayer pattern image to obtain the third image.

3. The white balance processing method of claim 1, wherein the second image comprises a first pixel, a second pixel, and a third pixel, wherein the third image comprises a fourth pixel, a fifth pixel, and a sixth pixel, and wherein obtaining the color correction matrix according to the second image and the third image comprises:
   obtaining a first vector according to a difference between the first pixel and the fourth pixel;
   obtaining a second vector according to a difference between the second pixel and the fifth pixel;
   obtaining a third vector according to a difference between the third pixel and the sixth pixel; and
   composing the color correction matrix by the first vector, the second vector, and the third vector.

4. The white balance processing method of claim 1, wherein the parameter of the white balance model is obtained through iteration using a back propagation algorithm according to a difference between predicted pixel information and the first pixel information, and the predicted pixel information refers to is output information obtained by inputting the sample color correction matrix into the white balance model.

5. The white balance processing method of claim 1, wherein the multispectral color filter array sensor is a sensor covering a mosaic color filter array on a pixel sensor.

6. The white balance processing method of claim 1, wherein the white balance model is a fully connected neural network.

7. The white balance processing method of claim 1, wherein the first interface is a main screen interface of the electronic device, the main screen interface comprises a camera application program, and the first control is a control corresponding to the camera application program.

8. The white balance processing method of claim 1, wherein the first interface is a photographing interface, and the first control is a control for capturing a photograph.

9. The white balance processing method of claim 1, wherein the first interface is a video shooting interface, and the first control is a control for capturing a video.

10. An electronic device, comprising:
a processor; and
a non-transitory memory coupled to the processor, wherein the non-transitory memory is configured to store instructions that, when executed by the processor, cause the electronic device be configured to:
display a first interface, wherein the first interface comprises a first control;
detect a first operation on the first control;
obtain a first image in response to the first operation, wherein the first image is an image of a first color space captured by a multispectral color filter array sensor;
perform decomposition processing and demosaicing processing on the first image to obtain a second image and a third image, wherein the second image is an image in a first color mode and the third image is an image in a second color mode;
obtain a color correction matrix according to the second image and the third image, wherein the color correction matrix represents a pixel change amount of transforming the second image into the third image;
input the color correction matrix into a white balance model to obtain a white balance parameter; and
perform image processing on the first image according to the white balance parameter to obtain a fourth image,
wherein the white balance model calculates a parameter of white balance processing,
wherein the white balance model is obtained through training using a sample color correction matrix as input data and first pixel information as target data,
wherein the sample color correction matrix is obtained according to a third sample image and a fourth sample image, the sample color correction matrix represents a pixel change amount of transforming the third sample image into the fourth sample image, and the third sample image and the fourth sample image are obtained by performing the decomposition processing and the demosaicing processing on a first sample image,
wherein the first pixel information is a pixel value corresponding to a neutral color block comprised in a color checker in a fifth sample image, the fifth sample image is obtained by performing the decomposition processing and the demosaicing processing on a second sample image, and
wherein the first sample image and the second sample image are images of the first color space captured by the multispectral color filter array sensor under a same light source scenario, and the second sample image comprises the color checker.

11. The electronic device of claim 10, wherein performing decomposition processing and demosaicing processing on the first image to obtain the second image and the third image comprises:
performing decomposition processing on the first image to obtain a first Bayer pattern image and a second Bayer pattern image, wherein the first Bayer pattern image is a Bayer pattern image in the first color mode and the second Bayer pattern image is a Bayer pattern image in the second color mode;
performing demosaicing processing on the first Bayer pattern image to obtain the second image; and
performing demosaicing processing on the second Bayer pattern image to obtain the third image.

12. The electronic device of claim 10, wherein the second image comprises a first pixel, a second pixel, and a third pixel, wherein the third image comprises a fourth pixel, a fifth pixel, and a sixth pixel, and wherein obtaining the color correction matrix according to the second image and the third image comprises:
obtaining a first vector according to a difference between the first pixel and the fourth pixel;
obtaining a second vector according to a difference between the second pixel and the fifth pixel;
obtaining a third vector according to a difference between the third pixel and the sixth pixel; and
composing the color correction matrix by the first vector, the second vector, and the third vector.

13. The electronic device of claim 10, wherein the parameter of the white balance model is obtained through iteration using a back propagation algorithm according to a difference between predicted pixel information and the first pixel information, and the predicted pixel information is output information obtained by inputting the sample color correction matrix into the white balance model.

14. The electronic device of claim 10, wherein the multispectral color filter array sensor is a sensor covering a mosaic color filter array on a pixel sensor.

15. The electronic device of claim 10, wherein the white balance model is a fully connected neural network.

16. The electronic device of claim 10, wherein the first interface is a main screen interface of the electronic device, the main screen interface comprises a camera application program, and the first control is a control corresponding to the camera application program.

17. The electronic device of claim 10, wherein the first interface is a photographing interface, and the first control is a control for capturing a photograph.

18. The electronic device of claim 10, wherein the first interface is a video shooting interface, and the first control is a control for capturing a video.

19. A non-transitory computer-readable storage medium comprising instructions that, when executed by a processor of an electronic device, cause the electronic device to be configured to:
display a first interface, wherein the first interface comprises a first control;
detect a first operation on the first control;
obtain a first image in response to the first operation, wherein the first image is an image of a first color space captured by a multispectral color filter array sensor;
perform decomposition processing and demosaicing processing on the first image to obtain a second image and a third image, wherein the second image is an image in a first color mode and the third image is an image in a second color mode;

obtain a color correction matrix according to the second image and the third image, wherein the color correction matrix represents a pixel change amount of transforming the second image into the third image;

input the color correction matrix into a white balance model to obtain a white balance parameter; and perform image processing on the first image according to the white balance parameter to obtain a fourth image, wherein the white balance model calculates a parameter of white balance processing, wherein the white balance model is obtained through training using a sample color correction matrix as input data and first pixel information as target data, wherein the sample color correction matrix is obtained according to a third sample image and a fourth sample image, the sample color correction matrix represents a pixel change amount of transforming the third sample image into the fourth sample image, and the third sample image and the fourth sample image are obtained by performing the decomposition processing and the demosaicing processing on a first sample image, wherein the first pixel information is a pixel value corresponding to a neutral color block comprised in a color checker in a fifth sample image, the fifth sample image is obtained by performing the decomposition processing and the demosaicing processing on a second sample image, and wherein the first sample image and the second sample image are images of the first color space captured by the multispectral color filter array sensor under a same light source scenario, and the second sample image comprises the color checker.

20. The non-transitory computer-readable storage medium of claim 19, wherein performing decomposition processing and demosaicing processing on the first image to obtain the second image and the third image comprises:

performing decomposition processing on the first image to obtain a first Bayer pattern image and a second Bayer pattern image, wherein the first Bayer pattern image is a Bayer pattern image in the first color mode and the second Bayer pattern image is a Bayer pattern image in the second color mode;

performing demosaicing processing on the first Bayer pattern image to obtain the second image; and performing demosaicing processing on the second Bayer pattern image to obtain the third image.

* * * * *

UNITED STATES PATENT AND TRADEMARK OFFICE
CERTIFICATE OF CORRECTION

PATENT NO. : 12,262,156 B2
APPLICATION NO. : 18/006180
DATED : March 25, 2025
INVENTOR(S) : Yanlin Qian Page 1 of 1

It is certified that error appears in the above-identified patent and that said Letters Patent is hereby corrected as shown below:

In the Claims

Claim 4, Column 32, Line 62: "information refers to is output information" should read "information is output information"

Signed and Sealed this
Twentieth Day of May, 2025

Coke Morgan Stewart
*Acting Director of the United States Patent and Trademark Office*